(12) United States Patent
Honey et al.

(10) Patent No.: US 12,329,060 B2
(45) Date of Patent: *Jun. 17, 2025

(54) HARVESTING HEADER KNIFE DRIVE ASSEMBLY

(71) Applicant: HONEY BEE MANUFACTURING LTD., Frontier (CA)

(72) Inventors: Gregory Honey, Bracken (CA); Glenn Honey, Bracken (CA)

(73) Assignee: HONEY BEE MANUFACTURING LTD., Frontier (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/076,957

(22) Filed: Dec. 7, 2022

(65) Prior Publication Data

US 2023/0113995 A1  Apr. 13, 2023

Related U.S. Application Data

(63) Continuation of application No. 16/563,423, filed on Sep. 6, 2019, now Pat. No. 11,547,043, which is a
(Continued)

(30) Foreign Application Priority Data

Jun. 9, 2014 (CA) ...................................... 2853947

(51) Int. Cl.
*A01D 34/32* (2006.01)
*A01D 34/14* (2006.01)
(Continued)

(52) U.S. Cl.
CPC ........... *A01D 34/32* (2013.01); *A01D 34/145* (2013.01); *A01D 34/305* (2013.01); *F16H 37/124* (2013.01); *A01D 2101/00* (2013.01)

(58) Field of Classification Search
CPC .... A01D 34/32; A01D 34/145; A01D 34/305; A01D 2101/00; F16H 37/124
See application file for complete search history.

(56) References Cited

U.S. PATENT DOCUMENTS

| 12,750 A | 4/1855 | Chatfield |
| 524,215 A | 8/1894 | Quigley |
(Continued)

FOREIGN PATENT DOCUMENTS

| CA | 1003310 | 1/1977 |
| CA | 1040438 | 10/1978 |
(Continued)

OTHER PUBLICATIONS

International Search Report mailed on Aug. 28, 2015 by the Canadian Intellectual Property Office in connection with International Patent Application No. PCT/CA2015/000370, 4 pages.
(Continued)

*Primary Examiner* — Abigail A Risic

(57) ABSTRACT

A knife drive assembly for use in a harvesting header may be mounted near the center line of the cutter bar of the header. Mechanical power from the power unit behind the header (typically the combine power output shaft) may be translated for application to two knife assembly sections in the cutter bar at the front of the cutter table. Movement of the two knife assembly sections with this apparatus can be fully synchronized and 180 degrees out of phase, to maximize cutting effectiveness and minimize vibration of the header. The unitary drive assembly may allow for rapid repair and manufacture, and the size and weight of the knife drive assembly may represent a significant weight and balance advantage over the prior art.

39 Claims, 20 Drawing Sheets

Related U.S. Application Data continuation of application No. 14/889,811, filed as application No. PCT/CA2015/000370 on Jun. 9, 2015, now Pat. No. 10,433,479.

(51) Int. Cl.
*A01D 34/30* (2006.01)
*F16H 37/12* (2006.01)
*A01D 101/00* (2006.01)

(56) References Cited

U.S. PATENT DOCUMENTS

| | | |
|---|---|---|
| 1,351,939 A | 9/1920 | Andre |
| 1,647,867 A | 11/1927 | Hutsell |
| 1,859,168 A | 5/1932 | Raney |
| 2,413,072 A | 12/1946 | Sage |
| 2,694,894 A | 11/1954 | Linscheld |
| 2,850,864 A | 9/1958 | Rohweder |
| 3,468,109 A | 9/1969 | Reimer |
| 3,472,008 A | 10/1969 | Hurlburt |
| 3,550,366 A | 12/1970 | Gibson |
| 3,742,691 A | 7/1973 | Graybill |
| 3,771,299 A | 11/1973 | Gradwohl et al. |
| 3,866,400 A | 2/1975 | May |
| 3,927,512 A | 12/1975 | Molzahn |
| 3,945,180 A | 3/1976 | Sinclair |
| 3,973,378 A | 8/1976 | Bartasevich et al. |
| 4,038,810 A | 8/1977 | Williams et al. |
| 4,067,177 A | 1/1978 | Tout |
| 4,120,137 A | 10/1978 | Schoenberger et al. |
| 4,127,981 A | 12/1978 | Parrish et al. |
| 4,137,696 A | 2/1979 | Webb |
| 4,156,340 A | 5/1979 | Colgan et al. |
| 4,174,602 A | 11/1979 | Webb et al. |
| 4,177,625 A | 12/1979 | Knight et al. |
| 4,187,664 A | 2/1980 | Meek et al. |
| 4,199,925 A | 4/1980 | Quick et al. |
| 4,202,154 A | 5/1980 | Waldrop et al. |
| 4,270,338 A | 6/1981 | Halls |
| 4,346,909 A | 8/1982 | Hundeby |
| 4,353,201 A | 10/1982 | Pierce et al. |
| 4,435,948 A | 3/1984 | Jennings |
| 4,512,140 A | 4/1985 | Blakeslee |
| 4,519,190 A | 5/1985 | Blakeslee |
| 4,522,018 A | 6/1985 | Blakeslee |
| 4,541,229 A | 9/1985 | Elijah |
| 4,573,309 A | 3/1986 | Patterson |
| 4,612,757 A | 9/1986 | Halls et al. |
| 4,637,201 A | 1/1987 | Pruitt et al. |
| 4,641,490 A | 2/1987 | Wynn et al. |
| 4,660,361 A | 4/1987 | Remillard et al. |
| 4,662,161 A | 5/1987 | Patterson |
| 4,751,809 A | 6/1988 | Fox et al. |
| 4,776,155 A | 10/1988 | Fox et al. |
| 4,815,262 A | 3/1989 | Koch et al. |
| 4,833,869 A | 5/1989 | Klein |
| 4,909,025 A | 3/1990 | Reissig et al. |
| 4,909,026 A | 3/1990 | Molzahn et al. |
| 4,936,082 A | 6/1990 | Majkrzak |
| 4,956,966 A | 9/1990 | Patterson |
| 5,005,343 A | 4/1991 | Patterson |
| 5,007,235 A | 4/1991 | Nickel et al. |
| 5,086,613 A | 2/1992 | Fox et al. |
| 5,157,905 A | 10/1992 | Talbot et al. |
| 5,243,810 A | 9/1993 | Fox et al. |
| 5,261,290 A | 11/1993 | Ramsay et al. |
| 5,359,839 A | 11/1994 | Parsons et al. |
| 5,435,239 A | 7/1995 | Talbot |
| 5,443,421 A | 8/1995 | Heintzman |
| 5,459,986 A | 10/1995 | Talbot et al. |
| 5,473,872 A | 12/1995 | Fox et al. |
| 5,497,605 A | 3/1996 | Underwood et al. |
| 5,595,053 A | 1/1997 | Jasper et al. |
| RE35,543 E | 7/1997 | Patterson |
| 5,678,398 A | 10/1997 | Fox et al. |
| 5,681,117 A | 10/1997 | Wellman et al. |
| 5,768,870 A | 6/1998 | Talbot et al. |
| 5,791,128 A | 8/1998 | Rogalsky |
| 5,927,606 A | 7/1999 | Patterson |
| 5,992,759 A | 11/1999 | Patterson |
| 6,029,429 A | 2/2000 | Fox et al. |
| 6,044,636 A | 4/2000 | Minnaert |
| 6,070,401 A | 6/2000 | Johnson |
| 6,079,194 A | 6/2000 | Waldrop |
| 6,170,244 B1 | 1/2001 | Coers et al. |
| 6,195,972 B1 | 3/2001 | Talbot et al. |
| 6,199,358 B1 | 3/2001 | Majkrzak |
| 6,282,876 B1 | 9/2001 | Patterson |
| 6,314,707 B1 | 11/2001 | Ryan |
| 6,324,823 B1 | 12/2001 | Remillard |
| 6,351,931 B1 | 3/2002 | Shearer |
| 6,397,573 B2 | 6/2002 | Majkrzak |
| 6,442,918 B1 | 9/2002 | Fox |
| 6,453,655 B2 | 9/2002 | Ferraris |
| 6,502,379 B1 | 1/2003 | Snider |
| 6,519,923 B1 | 2/2003 | Cooksey et al. |
| 6,530,202 B1 | 3/2003 | Guyer |
| 6,543,211 B1 | 4/2003 | Talbot |
| 6,591,598 B2 | 7/2003 | Remillard et al. |
| 6,675,568 B2 | 1/2004 | Patterson et al. |
| 6,698,175 B1 | 3/2004 | Schumacher et al. |
| 6,708,475 B2 | 3/2004 | Guyer |
| 6,817,166 B2 | 11/2004 | Dunn |
| 6,843,045 B2 | 1/2005 | Bickel |
| 6,854,251 B2 | 2/2005 | Snider |
| 6,865,871 B2 | 3/2005 | Patterson et al. |
| 6,889,492 B1 | 5/2005 | Polk et al. |
| 6,962,040 B2 | 11/2005 | Talbot |
| 7,077,220 B2 | 7/2006 | Dunn et al. |
| 7,131,253 B2 | 11/2006 | Remillard et al. |
| 7,159,687 B2 | 1/2007 | Dunn et al. |
| 7,188,461 B2 | 3/2007 | Fox et al. |
| 7,197,865 B1 | 4/2007 | Enns et al. |
| 7,306,062 B2 | 12/2007 | Dunn |
| 7,306,252 B2 | 12/2007 | Barnett |
| 7,308,947 B2 | 12/2007 | Barnett |
| 7,322,175 B2 | 1/2008 | Ferre et al. |
| 7,328,565 B2 | 2/2008 | Snider et al. |
| 7,340,876 B1 | 3/2008 | Barnett |
| 7,347,277 B2 | 3/2008 | Enns et al. |
| 7,356,982 B2 | 4/2008 | Barnett |
| 7,364,181 B2 | 4/2008 | Patterson |
| 7,373,769 B2 | 5/2008 | Talbot et al. |
| 7,392,124 B2 | 6/2008 | MacGregor et al. |
| 7,392,646 B2 | 7/2008 | Patterson |
| 7,438,305 B2 | 10/2008 | Schulz |
| 7,444,798 B2 | 11/2008 | Patterson et al. |
| 7,454,888 B2 | 11/2008 | Barnett |
| 7,461,498 B1 | 12/2008 | Barnett |
| 7,467,505 B2 | 12/2008 | MacGregor |
| 7,472,533 B2 | 1/2009 | Talbot et al. |
| 7,484,349 B2 | 2/2009 | Talbot et al. |
| 7,497,069 B2 | 3/2009 | Enns et al. |
| 7,647,755 B2 | 1/2010 | Barnett et al. |
| 7,658,059 B2 | 2/2010 | Majkrzak |
| 7,721,830 B2 | 5/2010 | Dunn et al. |
| 7,730,707 B2 | 6/2010 | Pietricola et al. |
| 7,836,671 B2 | 11/2010 | Sauerwein et al. |
| 7,849,952 B2 | 12/2010 | MacGregor et al. |
| 7,856,801 B2 | 12/2010 | Remillard |
| 7,886,512 B2 | 2/2011 | Lohrentz et al. |
| 7,918,076 B2 | 4/2011 | Talbot |
| 7,958,706 B2 | 6/2011 | Remillard et al. |
| 8,006,469 B2 | 8/2011 | Barnett |
| 8,015,784 B2 | 9/2011 | Barnett et al. |
| 8,020,363 B1 | 9/2011 | Barnett et al. |
| 8,020,648 B2 | 9/2011 | Otto |
| 8,056,311 B1 | 11/2011 | Barnett |
| 8,069,640 B2 | 12/2011 | Barnett et al. |
| 8,096,102 B2 | 1/2012 | Smith |
| 8,117,812 B2 | 2/2012 | Patterson |
| 8,161,719 B2 | 4/2012 | Barnett et al. |
| 8,176,716 B2 | 5/2012 | Coers et al. |
| 8,225,589 B2 | 7/2012 | Barnett |

(56) References Cited

U.S. PATENT DOCUMENTS

| | | | |
|---|---|---|---|
| 8,225,903 | B2 | 7/2012 | Dunn |
| 8,240,114 | B2 | 8/2012 | Barnett |
| 8,245,489 | B2 | 8/2012 | Talbot |
| 8,286,411 | B2 | 10/2012 | Barnett et al. |
| 8,286,412 | B2 | 10/2012 | Kidd et al. |
| 8,291,684 | B2 | 10/2012 | Remillard et al. |
| 8,291,686 | B1 | 10/2012 | Cormier et al. |
| 8,307,620 | B1 | 11/2012 | Barnett et al. |
| 8,341,927 | B2 | 1/2013 | Barnett |
| 8,347,594 | B1 | 1/2013 | Lovett et al. |
| 8,387,351 | B2 | 3/2013 | Guyer |
| 8,402,728 | B2 | 3/2013 | Kidd |
| 8,408,567 | B2 | 4/2013 | Bergman et al. |
| 8,434,290 | B2 | 5/2013 | Barnett et al. |
| 8,468,789 | B2 | 6/2013 | Barnett et al. |
| 8,484,938 | B2 | 7/2013 | Cormier et al. |
| 8,484,939 | B1 | 7/2013 | Cormier et al. |
| 8,511,050 | B1 | 8/2013 | Cormier et al. |
| 8,590,284 | B2 | 11/2013 | Rayfield |
| 9,357,696 | B2 | 6/2016 | Ritter et al. |
| 9,357,697 | B2 | 6/2016 | Surmann et al. |
| 9,532,502 | B2 | 1/2017 | Cook et al. |
| 10,568,259 | B2 | 2/2020 | Cook et al. |
| 10,602,662 | B2 | 3/2020 | Cook et al. |
| 2009/0129900 | A1 | 5/2009 | Ito et al. |
| 2011/0078989 | A1 | 4/2011 | Bich et al. |
| 2011/0099964 | A1 | 5/2011 | Coers et al. |
| 2012/0251653 | A1 | 10/2012 | Mathy, Jr. et al. |
| 2012/0260870 | A1 | 10/2012 | Wahl et al. |
| 2013/0036860 | A1 | 2/2013 | Corniani |
| 2014/0001726 | A1 | 1/2014 | Statz |
| 2014/0033940 | A1 | 2/2014 | Simpson et al. |
| 2014/0150601 | A1 | 6/2014 | McGrath |
| 2014/0215991 | A1 | 8/2014 | Brimeyer et al. |
| 2015/0305233 | A1 | 10/2015 | Surmann et al. |
| 2018/0184587 | A1 | 7/2018 | Cook et al. |
| 2019/0191625 | A1 | 6/2019 | Cook |
| 2019/0208702 | A1 | 7/2019 | Cook et al. |
| 2020/0187414 | A1 | 6/2020 | Cook et al. |

FOREIGN PATENT DOCUMENTS

| | | |
|---|---|---|
| CA | 1043577 | 12/1978 |
| CA | 2180627 | 1/1980 |
| CA | 1086508 | 9/1980 |
| CA | 1087402 | 10/1980 |
| CA | 1185438 | 4/1985 |
| CA | 1197694 | 12/1985 |
| CA | 1318135 | 5/1993 |
| CA | 2100204 | 1/1995 |
| CA | 2126909 | 1/1995 |
| CA | 2138939 | 6/1996 |
| CA | 2165735 | 6/1997 |
| CA | 2180625 | 1/1998 |
| CA | 2180626 | 1/1998 |
| CA | 2211363 | 1/1998 |
| CA | 2198672 | 8/1998 |
| CA | 2226200 | 11/1998 |
| CA | 2229152 | 8/1999 |
| CA | 2245213 | 2/2000 |
| CA | 2280681 | 2/2000 |
| CA | 2184278 | 8/2000 |
| CA | 2289164 | 10/2000 |
| CA | 2289171 | 10/2000 |
| CA | 2284432 | 4/2001 |
| CA | 2284436 | 4/2001 |
| CA | 2320379 | 5/2001 |
| CA | 2307176 | 10/2001 |
| CA | 2311019 | 12/2001 |
| CA | 2320524 | 3/2002 |
| CA | 2357825 | 9/2002 |
| CA | 2380557 | 10/2002 |
| CA | 2387898 | 12/2002 |
| CA | 2358883 | 4/2003 |
| CA | 2359598 | 4/2003 |
| CA | 2370891 | 4/2003 |
| CA | 2399234 | 6/2003 |
| CA | 2389513 | 12/2003 |
| CA | 2406416 | 4/2004 |
| CA | 2406419 | 4/2004 |
| CA | 2427755 | 11/2004 |
| CA | 2461790 | 11/2004 |
| CA | 2467595 | 12/2004 |
| CA | 2434981 | 1/2005 |
| CA | 2510883 | 12/2005 |
| CA | 2513037 | 2/2006 |
| CA | 2341283 | 3/2006 |
| CA | 2494395 | 6/2006 |
| CA | 2494034 | 7/2006 |
| CA | 2505431 | 9/2006 |
| CA | 2505458 | 9/2006 |
| CA | 2531189 | 9/2006 |
| CA | 2513605 | 1/2007 |
| CA | 2513614 | 1/2007 |
| CA | 2528731 | 1/2007 |
| CA | 2743336 | 1/2007 |
| CA | 2521187 | 3/2007 |
| CA | 2522387 | 4/2007 |
| CA | 2524151 | 4/2007 |
| CA | 2525904 | 5/2007 |
| CA | 2527797 | 5/2007 |
| CA | 2534200 | 6/2007 |
| CA | 2538020 | 8/2007 |
| CA | 2554689 | 1/2008 |
| CA | 2596403 | 2/2008 |
| CA | 2559217 | 3/2008 |
| CA | 2559353 | 3/2008 |
| CA | 2561463 | 3/2008 |
| CA | 2609744 | 5/2008 |
| CA | 2627320 | 9/2008 |
| CA | 2626486 | 2/2009 |
| CA | 2639032 | 3/2009 |
| CA | 2783567 | 3/2009 |
| CA | 2587107 | 7/2009 |
| CA | 2627053 | 9/2009 |
| CA | 2578907 | 4/2010 |
| CA | 2671880 | 4/2010 |
| CA | 2564777 | 8/2010 |
| CA | 2695689 | 9/2010 |
| CA | 2665580 | 11/2010 |
| CA | 2665589 | 11/2010 |
| CA | 2706704 | 1/2011 |
| CA | 2706705 | 1/2011 |
| CA | 2706706 | 1/2011 |
| CA | 2706707 | 1/2011 |
| CA | 2775891 | 1/2011 |
| CA | 2783670 | 1/2011 |
| CA | 2713636 | 2/2011 |
| CA | 2596627 | 4/2011 |
| CA | 2686017 | 5/2011 |
| CA | 2721118 | 5/2011 |
| CA | 2739632 | 11/2011 |
| CA | 2708744 | 12/2011 |
| CA | 2745105 | 12/2011 |
| CA | 2538489 | 1/2012 |
| CA | 2707624 | 1/2012 |
| CA | 2709336 | 1/2012 |
| CA | 2710676 | 2/2012 |
| CA | 2734475 | 5/2012 |
| CA | 2766611 | 7/2012 |
| CA | 2744070 | 12/2012 |
| CA | 2802894 | 1/2013 |
| CA | 2796109 | 5/2013 |
| CA | 2796120 | 5/2013 |
| CA | 2796131 | 5/2013 |
| CA | 2796134 | 5/2013 |
| CA | 2796177 | 5/2013 |
| CA | 2796165 | 6/2013 |
| CA | 2802958 | 7/2013 |
| CA | 2802963 | 7/2013 |
| CA | 2802972 | 7/2013 |
| CA | 2802975 | 7/2013 |
| CA | 2803470 | 7/2013 |
| CA | 2814924 | 10/2013 |

(56) References Cited

FOREIGN PATENT DOCUMENTS

| | | |
|---|---|---|
| CA | 2815395 | 10/2013 |
| CA | 2815408 | 10/2013 |
| CA | 2815421 | 10/2013 |
| CA | 2815427 | 10/2013 |
| DE | 102014003493 A1 | 9/2015 |
| DE | 102015106087 A1 | 10/2016 |
| EP | 1935226 | 6/2008 |
| WO | 2012/166672 | 6/2012 |
| WO | 2012/166629 | 12/2012 |

OTHER PUBLICATIONS

Written Opinion of the International Searching Authority mailed on Aug. 28, 2015 by the Canadian Intellectual Property Office in connection with International Patent Application No. PCT/CA2015/000370, 5 pages.

International Search Report issued by the Canadian Intellectual Property Office (CIPO) on Feb. 12, 2025 in connection with International PCT Patent Application No. PCT/CA2024/050784, 6 pages.

Written Opinion of the International Searching Authority issued by the Canadian Intellectual Property Office (CIPO) on Feb. 12, 2025 in connection with International PCT Patent Application No. PCT/CA2024/050784, 7 pages.

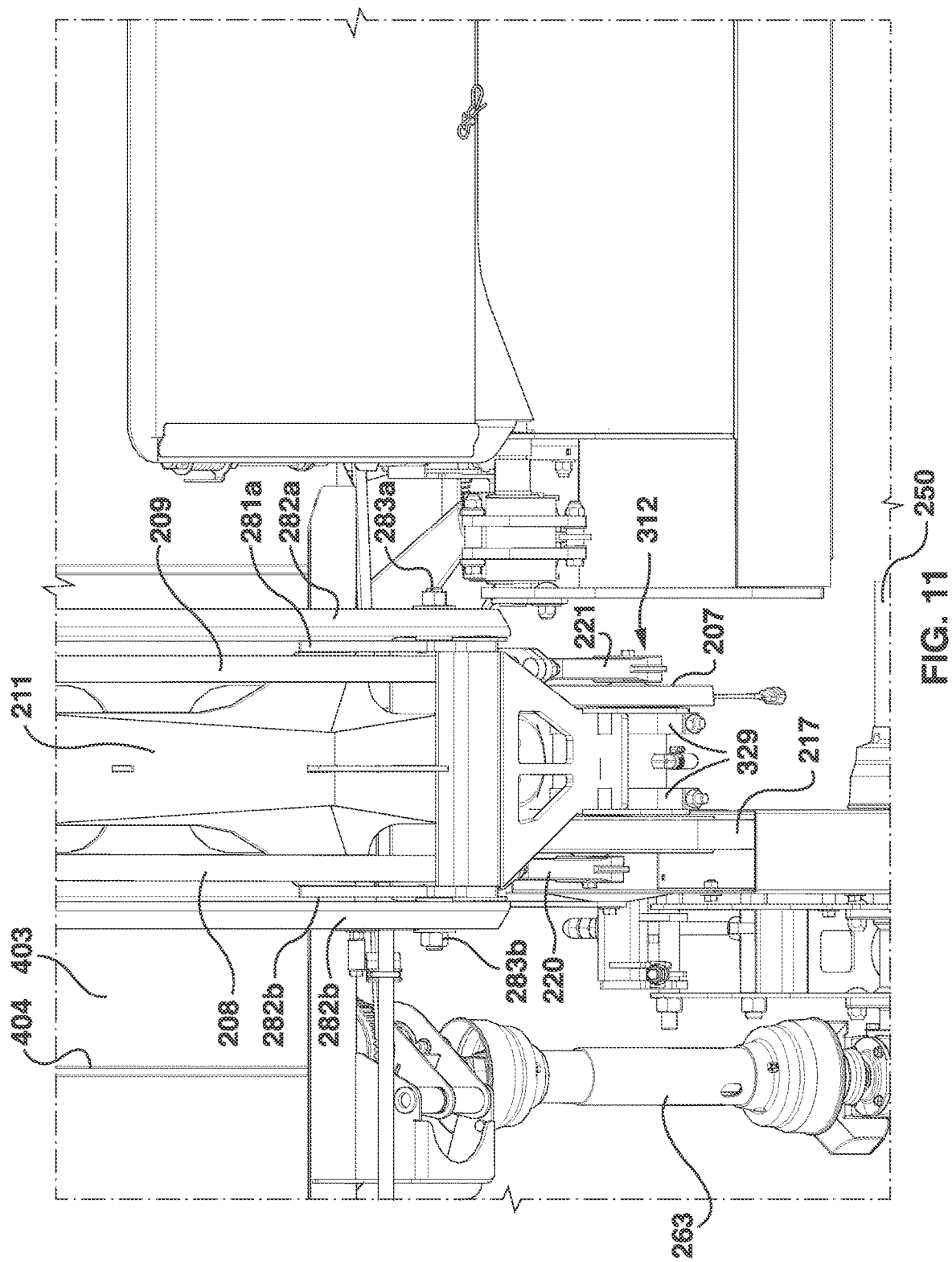

HARVESTING HEADER KNIFE DRIVE ASSEMBLY

CROSS-REFERENCE TO RELATED APPLICATIONS

This application is a Continuation of U.S. patent application Ser. No. 16/563,423 filed on Sep. 6, 2019, which is a Continuation of U.S. patent application Ser. No. 14/889,811 with a 371(c) date of Nov. 6, 2015 (now U.S. Pat. No. 10,433,479 issued on Oct. 8, 2019), which is a National Phase Entry of International PCT Patent Application Serial No. PCT/CA2015/000370 filed on Jun. 9, 2015 designating the United States and which claimed the foreign priority benefit of Canadian Patent Application Serial No. 2,853,947 filed on Jun. 9, 2014. The entire contents of the aforementioned applications are incorporated by reference herein.

FIELD

This invention is in the field of harvesting equipment, and in particular relates to drive assemblies used to actuate the cutter bars on crop cutting headers.

BACKGROUND

Some known harvesting equipment employ harvesting headers to cut crops for various purposes, such as for windrowing or swathing, or for the feeding of a combine harvester.

Attached to the front portion of a combine harvester or other equipment such as for example a swather) is the portion referred to as the header. A typical header is equipped with a crop cutting mechanism (often referred to as a cutter bar), and a conveyor deck or surface behind the cutter bar onto which cut crop material will fall for direction to a windrow discharge or into the combine. The header also typically includes a bat reel, which is typically a reel mounted between two rotational mounts at either end of the header with a rotational power drive attached thereto, with rotating bats that gather standing crop material into the cutter bar and transfer the cut crop onto a draper table.

With headers of increasing width, there are a number of manufacturing parameters or limitations with respect to the header frame which limit the ability to extend the length (or harvesting width) of the header. One limitation is the weight and complexity of the mechanical power system used to actuate the cutting mechanism such as a cutting knife, as the width of the header increases.

In known headers, a cutting knife is typically driven by either a hydraulic or mechanical drive. The drive mechanism translates power derived from a central location of the harvesting header to an outer end of the harvesting header, where reciprocating motion may be applied, to cause the cutting knife to move back and forth in its guide and cut crop material that comes into contact or close proximity with the cutting mechanism. An issue with such an approach is that, whether hydraulics or mechanical power are used to drive the cutting knife, the addition of a reciprocating drive mechanism at the outer end of the harvesting header results in the addition of significant outboard weight to the header, causing balance issues. Additionally, by providing the necessary components to these drives add significant weight to the header as well. Finding a way to minimize the weight of cutting knife drive components in a harvesting header is desirable.

Translating rotational power from the combine or other power unit, or even providing hydraulic power, to a knife drive assembly located at one or both ends of header table, results in significant mechanical complexity during construction and maintenance of the knife drive mechanism. In addition to the relatively large number of parts typically involved in the construction and maintenance of known harvesting headers, it can be difficult to perform in-field service on this type of the knife drive assembly. A way to drive the cutting knife of harvesting headers which minimized or at least reduced the number of parts, for repair purposes or otherwise, would be desirable in the industry as a means of streamlining repair and maximizing or at least increasing harvesting header uptime in the field.

Another issue with known knife drives used in known harvesting headers is that of vibration during operation of the harvesting header. Particularly, in a harvesting header knife drive that drives the cutting knife along the entire width of the harvesting header from a single drive point/location at one end of the harvesting header, there can be significant vibration of the harvesting header and the entire combine harvesting unit as the knife operates. Even in known knife drives that are centrally located near the center line of the harvesting header, vibration has been an issue. A way to minimize, or least reduce, the amount of vibration of the header, and that would maximize or increase the efficiency of the unit, as well as the level of operator comfort, is desirable.

Another limitation associated with known harvesting headers is the interruption, or interference, with an otherwise streamlined or low profile at the cutter bar on the harvesting header. The interruption or interference impedes the efficacy of the harvesting header overall and can interfere with crop flow. Typical central drive solutions for cutting knives in a harvesting header are typically either flush on the bottom of the cutter bar with the drive components protruding on top, or are flush to the top of the cutter bar with drive components protruding out the bottom. Any non-conformity or significant height difference in the area of the draper deck and the cutting bar acts as a barrier to crop flow. A knife drive for use with a harvesting header having a sufficiently low profile at the cutter bar to allow for normal or low skid plate profiles under the cutter bar would allow for the cutting knife to be positioned as low as possible to perform near the ground.

Additionally, some known center cutting knife drives utilize a gearbox that is quite wide and deep, resulting in a negative impact on crop flow and performance, and limit additional cutter bar features. For example, some known harvesting headers often include rock traps and other features. The ability to include such features near the cutter bar on a harvesting header where a conventional center cutting knife drive is used is limited, due to the space consumed by the drive components.

SUMMARY

The present invention attempts to address a number of limitations in the known center knife drives used on harvesting headers. In one embodiment, a unitary knife drive assembly is provided, which may be easily installed on, or removed from, a harvesting header as a "unit"), minimizing or at least reducing maintenance requirements and time, as well as providing significant performance advantages.

In one embodiment, a unitary knife drive assembly is provided which is a knife drive mounted near the center line of the harvesting header and translates rotary drive power from an input shaft to reciprocating motion to be applied to two bifurcated knife sections along the cutter bar at the front of the header. A drive paddle may be provided, which extends beneath the draper table of the header, and the drive arm extends pivotably upward from the rearward end of the paddle towards the drive pulley, which can be attached to the rotational power source. A left and right eccentric wheel or disc (each hereinafter referred to as "eccentric") may be attached through a bearing and about a shaft along with a driven pulley near the rearward end of the drive paddle. Rotational force may be provided from the drive pulley to the driven pulley by a drive belt.

The left and right eccentrics may be configured such that a left and right push rod attached to them provides equal and opposite pushing motion to the left and right push rods. The left or right push rods may extend forward along the drive paddle to the knife head area of the drive paddle, where they will exert their pushing and pulling force upon left and right bell cranks configured to provide back-and-forth motion when attached to the bifurcated knife sections. Movement of the majority of the components of a knife drive assembly to the rear of the header and reduces the weight on the cutter bar as well as allows for a minimized profile of the cutter bar. It may also allow for the cutter bar to operate as close as possible to the ground and for crop material to flow over the cutter onto the draper.

Unitary construction simplifies the manufacture and installation of the knife drive assembly. A relatively small amount of hardware is required to mount this knife drive assembly, attach it to the respective bifurcated knife sections and engage the input rotation source.

In addition to a knife drive assembly for a harvesting header, there is also disclosed a harvesting header including the unitary knife drive assembly in accordance with the remainder of the present invention. Using the knife drive assembly of the present invention, which may be mounted near the center line of the header, in conjunction with the bifurcated knife described herein, may result in a harvesting header that has a relatively desirable low profile along the length of the cutter bar, minimized weight at the outside edges of the header, and minimized vibration in operation by virtue of the fact that the two bifurcated blade sections move equally in opposite directions at the same time.

According to one aspect of the present invention, there is provided a knife drive assembly for a harvesting header configured to move at least one knife in transverse motion. The assembly comprises: (a) a rotation interface mechanism configured and operable to couple with a rotating output shaft of an external power source to cause rotation of a rotating member; (b) a first movement conversion mechanism operable to convert the rotation of the rotating member to reciprocating longitudinal movement of at least one longitudinally extending movement member; and (c) a second movement conversion mechanism operable to convert the reciprocating longitudinal movement of the at least one longitudinally extending movement member to transverse reciprocating movement of the at least one knife.

According to another aspect of the present invention, there is provided a header for a piece of agricultural equipment. The header comprises: a header frame; a cutter bar assembly having at least one transversely oriented knife; and a knife drive assembly mounted longitudinally between an inward region of a frame of the header and the cutter blade assembly.

According to another aspect of the present invention, there is provided a knife drive assembly for a harvesting header configured to move at least one knife in transverse motion. The assembly comprises: (a) means for coupling with a rotating output shaft of an external power source to cause rotation of a rotating member; (b) means for converting the rotation of the rotating member to longitudinal movement of at least one longitudinally extending movement member; and (c) means for converting the longitudinal movement of the at least one longitudinally extending movement member to transverse movement of at least one knife.

According to another aspect of the present invention, there is provided a header for a piece of agricultural equipment. The header comprises: a header frame; a cutter bar assembly having at least one transversely oriented knife; and a knife drive assembly mounted longitudinally between an inward region of a frame of the header and the cutter blade assembly. The knife drive assembly comprises: (a) means for coupling with a rotating output shaft of an external power source to cause rotation of a rotating member; (b) means for converting the rotation of the rotating member to reciprocating longitudinal movement of at least one longitudinally extending movement member; and (c) means for converting the reciprocating longitudinal movement of the at least one longitudinally extending movement member to transverse reciprocating movement of at least one knife.

According to another aspect of the present invention, there is provided a knife drive assembly for a harvesting header configured to move at least one knife in transverse motion. The assembly comprises: (a) a rotation interface mechanism configured and operable to couple with a rotating output shaft of an external power source to cause rotation of a rotating member; (b) a first movement conversion mechanism operable to convert a rotational input provided by a rotational power source to drive at least one longitudinally moving member in reciprocating longitudinal movement; and (c) a second movement conversion mechanism operable to convert the reciprocating movement of the at least one longitudinally moving member to drive at least one knife in transverse motion.

BRIEF DESCRIPTION OF THE DRAWINGS

While the invention is claimed in the concluding portions hereof, example embodiments are provided in the accompanying detailed description which may be best understood in conjunction with the accompanying diagrams where like parts in each of the several diagrams are labeled with like numerals, and where:

FIG. 11 is a bottom plan view of the part of the harvesting header of FIG. 7;

DETAILED DESCRIPTION

The following discussion provides many example embodiments of the inventive subject matter. Although each embodiment represents a single combination of inventive elements, the inventive subject matter is considered to include all possible combinations of the disclosed elements.

Harvesting headers are the cutting face attachment typically used with agricultural equipment such as a combine harvester or the like. The header typically includes a reel rotatably mounted approximately perpendicular to the working direction of travel of the implement. When the reel is rotated, feed crop material in the crop field is engaged by a cutter bar mounted along the front transverse side of the header. Once the crop material is cut, the reel will deposit that cut crop material into an auger or onto a draper canvas/conveyor which will feed it either to a discharge in the case of the swather or windrowing machine, or into the throat of a combine harvester etc.

Figure 1:
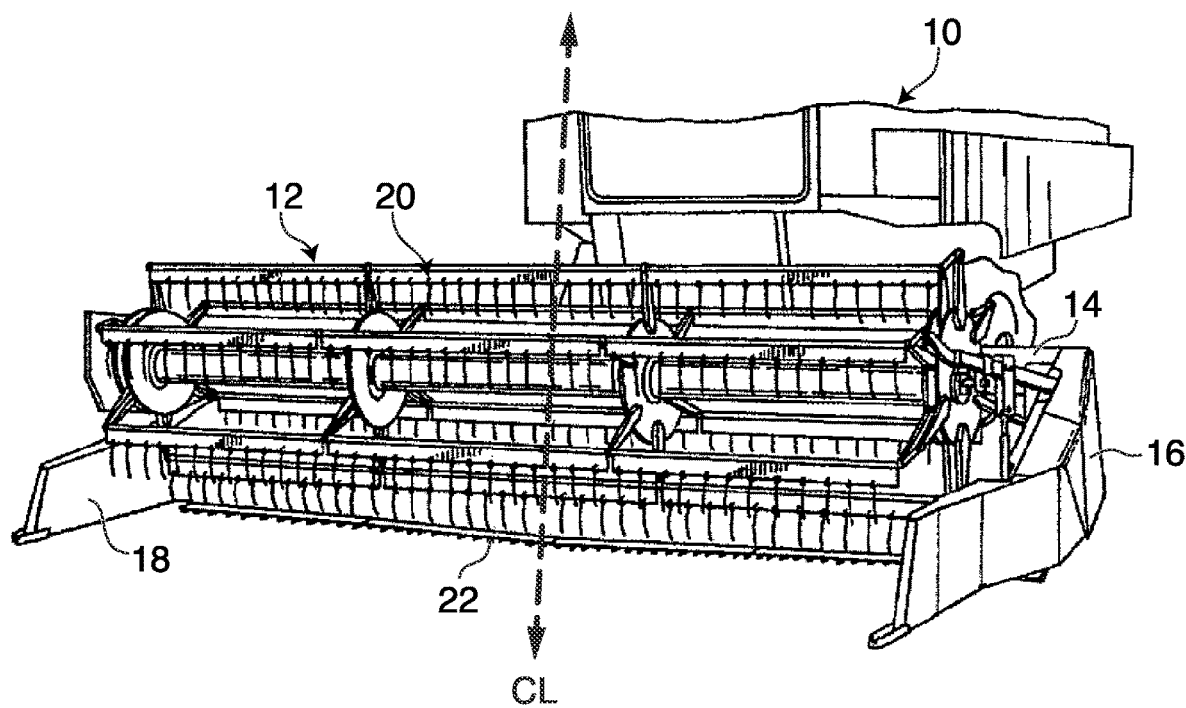
FIG. 1 is a perspective view of a known harvesting header, for the purpose of demonstrating the general area of installation of prior art knife drives versus that of the present invention.

FIG. 1 shows a prior art harvesting header. A propulsion unit 10 of a combine harvester has attached thereto a header 12. The header 12 includes a back frame portion 14 and side strut supports 16 and 18. A reel 20 is secured for rotation to the side strut supports 16 and 18. Also, at a front outward transverse side of the header is a cutter bar assembly 22. Cutter bar assembly 22 may comprise a knife section that may be driven in transverse reciprocating motion to cut crop that is engages with reel 20 of the header 12. FIG. 1 also demonstrates the center line of the harvesting header. In FIG. 1, center line 'CL' is shown. The center line is at the halfway point in the transverse direction along the harvesting header or half-way in the width of the harvesting header.

Figure 2:
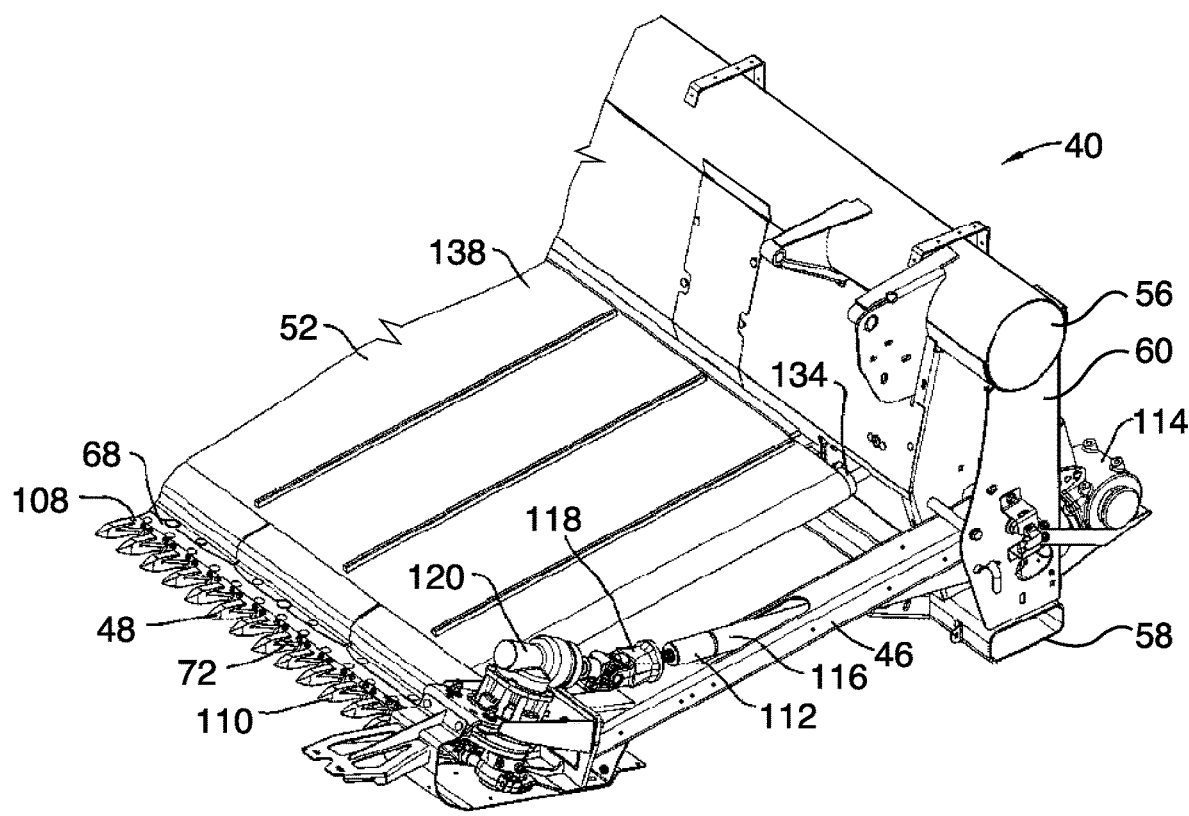
FIG. 2 is a figure depicting a known end knife drive in a harvesting header.

FIG. 2 demonstrates a known end drive for a knife in a harvesting header. FIG. 2 illustrates the mechanical complexity of many of the prior art drives. In FIG. 2 an end portion of a header 40 includes a support frame having upper beam 56 and lower beam 58 interconnected by a series of spaced channels 60. Also provided is an arm assembly 46 interconnected to the support frame. A draper 52 with draper belt 138 extends transversely between the support frame and a cutter bar assembly 68. The knife or sickle assembly 72, with knives 108 and knife guards 110, is supported on a transversely extending bar of the cutter bar assembly 68. A cutter bar drive assembly 112 is shown which includes a gear drive 114, drive shaft 116, universal joint 118 and a gear box/epicyclic drive 120. All these components of the cutter bar drive assembly 112 are located at the end of the header with several relatively heavy components located in a outward position on or proximate the cutter bar. This configuration thus suffers from at least some of the drawbacks referred to above.

General Inventive Concept:

In one embodiment, the knife drive assembly of the present invention can be installed on the harvesting header as a unitary component (ie. as a unit). Manufacture of a unitary component knife drive assembly, in addition to the other technical benefits outlined herein, will allow for significant advantages in terms of the efficiency of repair of the header in the field if there is ever a failure or problem with the knife drive. The knife drive assembly can be removed and replaced with a minimum amount of tools and time, and replaced with another unitary knife drive assembly, and subsequently repaired for another "hot swap" replacement operation into a header if required.

By virtue of the fact that an embodiment of the knife drive assembly of the present invention is a single assembly, it provides for ease of manufacture, set up and rigidity of the design. This is not typical in current knife drive mechanisms in the industry. Normally components of the knife drive are located in various different parts of the table and are connected by various power transmission devices (e.g. hydraulic or mechanical) to the power source on the combine feed house—typically an output shaft. The present new unified design minimizes or at least reduces weight and complexity, and reduces power losses resulting from distributed power transmission. Furthermore, it is conceived that connecting the unified mechanical assembly directly to the combine output shaft will result in significant manufacturing improvements and simplification, and significantly reduce the possibility of distributed power transmission loss.

Center Mounted Drive:

An embodiment of the unitary knife drive assembly of the present invention is intended for mounting near the center line of a harvesting header, such that it can be directly connected to available rotational power from the combine power unit with a minimum of additional mechanical components. This new design minimizes the overall weight of the header by reducing/minimizing additional mechanical components and the reduces/minimizes the complexity of the knife drive itself, in the process reducing power losses on the overall unit due to distributed power transmission issues. Mounting of the knife drive of the present invention in proximity to the center line of the harvesting header, resulting in weight minimization and minimized distributed power loss, is one of the first major benefits of the present design.

By locating the knife drive in close proximity to the combine's power output shaft, the need for additional mechanical drivetrain to drive the knife on the header is eliminated or at least substantially reduced. This allows the knife to be directly driven from the combine's output shaft, with no other additional power transmission elements. This reduces/minimizes friction losses and power loss on the combine.

Central mounting of the knife drive assembly also moves the drive assembly itself, which can be somewhat weighty or heavy, closer to the transverse center of the table and the combine. Accordingly, central mounting of the knife drive provides for enhanced performance and less negative kinetic mass impact on the table. Many of the prior art systems have the knife drive mounted at the left or right extremities of the table in line with the cutter bar at the furthest forward position. The heavy mass of these knife drives combined with those extreme distal locations results in a negative impact on the mobility of the table and adds unnecessary stresses to the frame of the harvesting header, which must be reinforced further to carry this mass Accordingly, weight is minimized with the knife drive being centrally located. Additionally, minimizing the weight of the knife drive assembly decreases the overall weight of the harvesting header, and the distal weights at the ends of the table. Accordingly, the decreased weight allows for additional gross weight allowance to be used in manufacturing a wider header.

Figure 3:
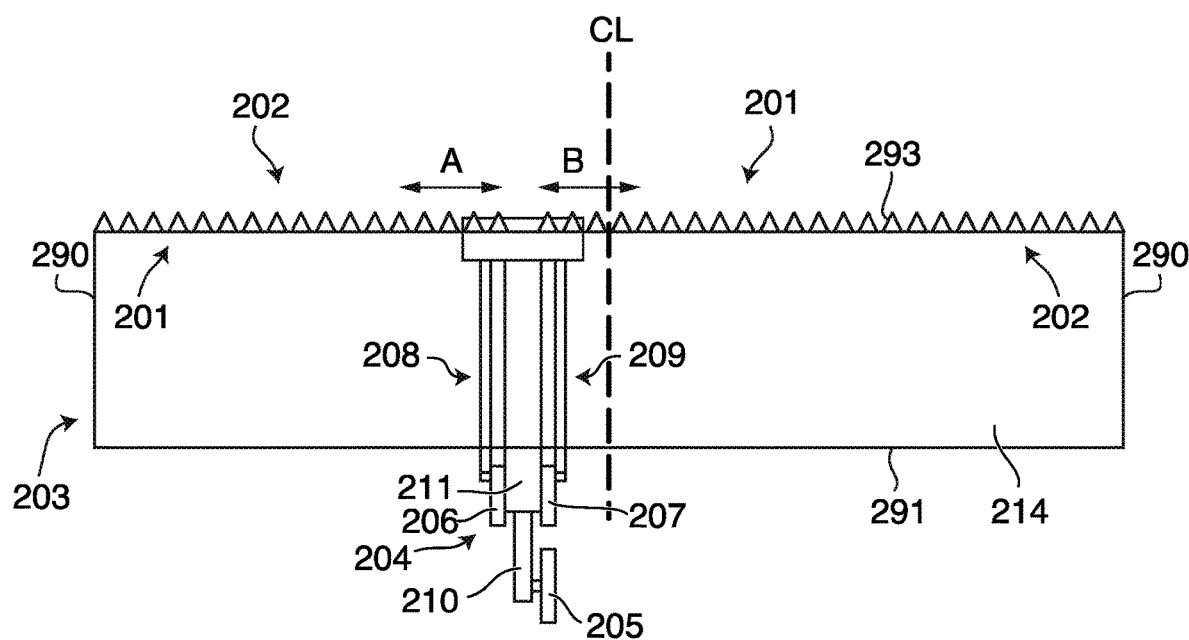
FIG. 3 is a schematic view from the bottom of a harvesting header deploying a knife drive in accordance with one embodiment of the present invention.

FIG. 3 is a schematic view of a harvesting header 203, with a bifurcated knife shown—where the knife is divided into two similar, preferably substantially the same, length knife assembly sections 201, 202 at the front edge of the table. The direction and stroke of travel of the two knife assembly sections 201, 202 is shown at 'A' and 'B'. The center line of the header is shown at 'CL'.

The general components of the knife drive assembly 204 of the present invention (as shown in FIGS. 3-6) include: a drive paddle 211, a drive arm 210, a drive pulley 205, left and right eccentric wheels or discs 206 and 207 (referred to herein as an "eccentric" or "eccentrics" for simplicity), and left and right push rods 208 and 209. The drive paddle 211 extends beneath the draper table of the harvesting header 203. The drive arm 210 extends upward pivotally from the end of the drive paddle 211 towards the drive pulley 205. The drive pulley 205 can be attached to the rotational power source on the combine. The left and right eccentrics 206 and 207 are connected to the left and right push rods 208 and 209. The left and right eccentrics 206 and 207 are also connected, via the left and right push rods 208 and 209, to left and right ball joints and bell cranks 223 and 224 at the outward end of the drive paddle 211, such that they will exert reciprocating horizontal movement on the two knife assembly sections 201 and 202.

Left and right push rods 208 and 209 are pivotally connected to the eccentrics 206 and 207, such that the push rods are 180° out of phase. Accordingly, when the eccentrics 206, 207 on their shaft are rotated, by virtue of the connection point of each of the push rods to their respective eccentric, reciprocating movement in opposite direction, fully synchronized, will be provided. For example, knife assembly section 201 will reciprocally move towards the outer end of the header at the same time that knife section 202 moves towards the opposite end of the header. Ensuring that the knives of knife assembly sections 201, 202 are traveling equal and opposite directions at all times is one of the key technical benefits of the present invention.

The embodiment shown in FIG. 3 is illustrated in such a way that it would be connected to the right-hand side of the combine power unit, facing forward from the combine operator position. This is shown for demonstrative purposes—it is as likely that in most cases the knife drive assembly would be connected to the right-hand side of the combine power unit but it will be understood that reflective manufacture of the knife drive assembly of the present invention for attachment to either the right-hand side or the left-hand side of the combine or other power unit is within the scope of the present invention.

Bifurcated Knife Sections:

One of the key prior art issues which was desired to be addressed by the creation of the present drive assembly was to minimize vibration caused by the reciprocal movement of the knife on a harvesting header. The present invention may reduce or minimize vibration by providing two fully synchronized reciprocal drives for connection to two knife sections 201, 202 extending in either direction from the point of drive attachment near the center line of the harvesting header 203. By providing two fully synchronized reciprocal drives 201, 202 which are 180° out of phase with each other, vibration of the knives from their reciprocal movement is reduced to a minimum. The cooperation of a dual synchronized reciprocal drive with a bifurcated knife, whereby each bifurcated knife section will move reciprocally in synchronized out of phase movement as it is driven is explicitly contemplated to comprise an aspect of the present invention. Beyond just the unitary knife drive mechanism of the present invention, the overall concept of a dual synchronized reciprocal drive with bifurcated knife sections, which is directly mechanically driven by a mechanical drive in accordance with the remainder of the present invention is explicitly contemplated within the scope of the present invention.

The knife on a harvesting header may not be divided perfectly in half, since it is explicitly contemplated that the knife drive assembly of the present invention would be mounted in proximity but to one side of the center line of the header, extending forward from the rear of the header approximately parallel to the center line and approximately perpendicular to the orientation and direction of travel of the header. However, by bifurcating the knife near the center line of the header such that it is divided approximately in half, even if not perfectly in half, by provisioning two bifurcated knife sections 201, 202 of generally the same size will still result in the desired vibration minimization. Minimizing the vibration of the device and the knife is accomplished, in some embodiments, by ensuring that the two knife assembly sections travel in equal and opposite directions at all times.

Unified Mechanical Element:

One of the primary benefits which is contemplated with respect to the present invention, in addition to the enhanced knife behavior which is achieved from the bifurcated knife blade operating in conjunction with the knife drive assembly, is that the knife drive assembly of the present invention can be manufactured as a reasonably streamlined and unitary component, which can be easily installed, replaced or swapped on the device. As is stressed and outlined herein, the fact that the knife drive assembly 204 can be manufactured in a reasonably compact and easily installed single component array, represents a significant mechanical enhancement over previous designs.

Figure 4:
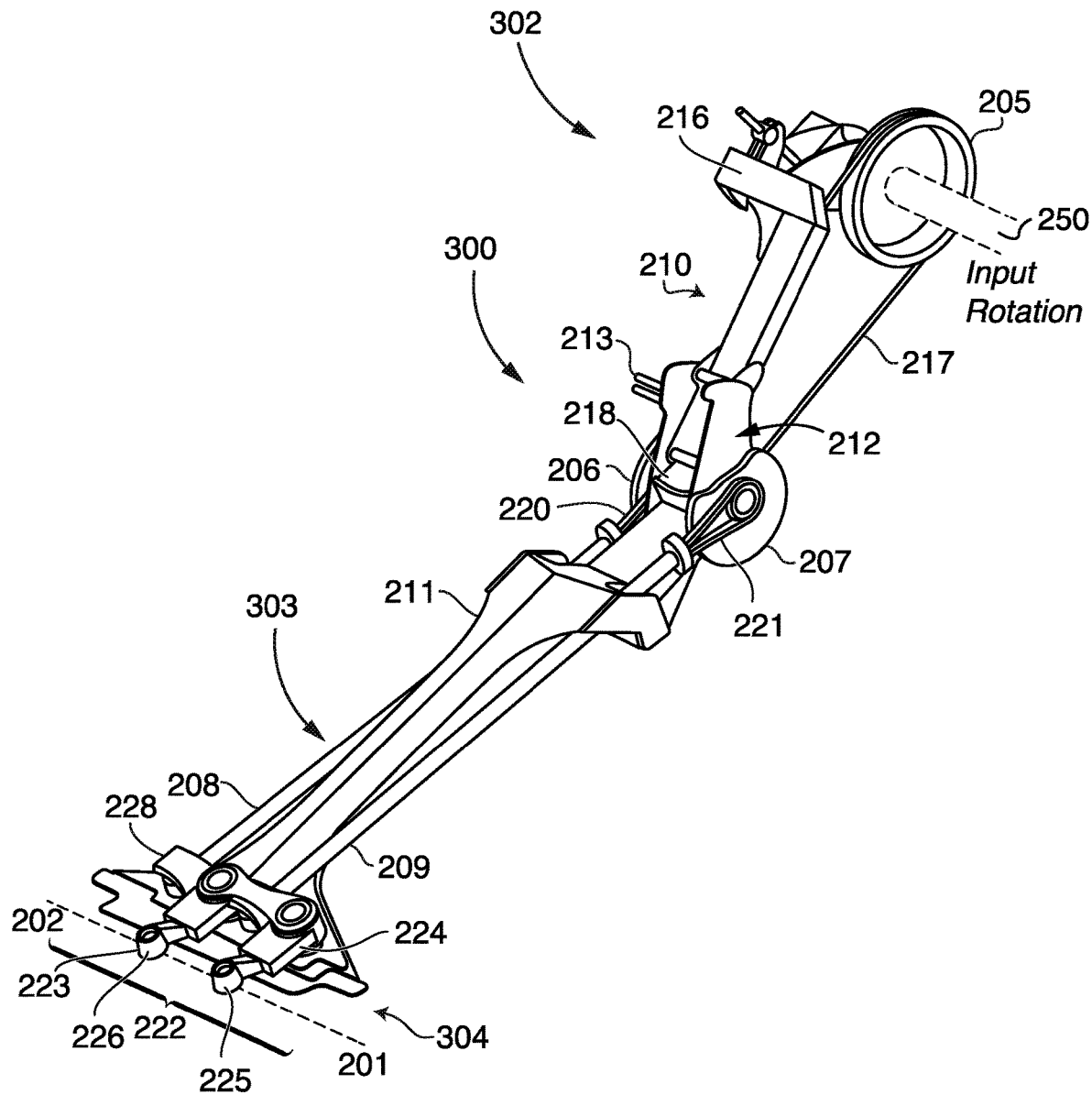
FIG. 4 is a perspective view of an embodiment of the knife drive assembly.
Figure 5:
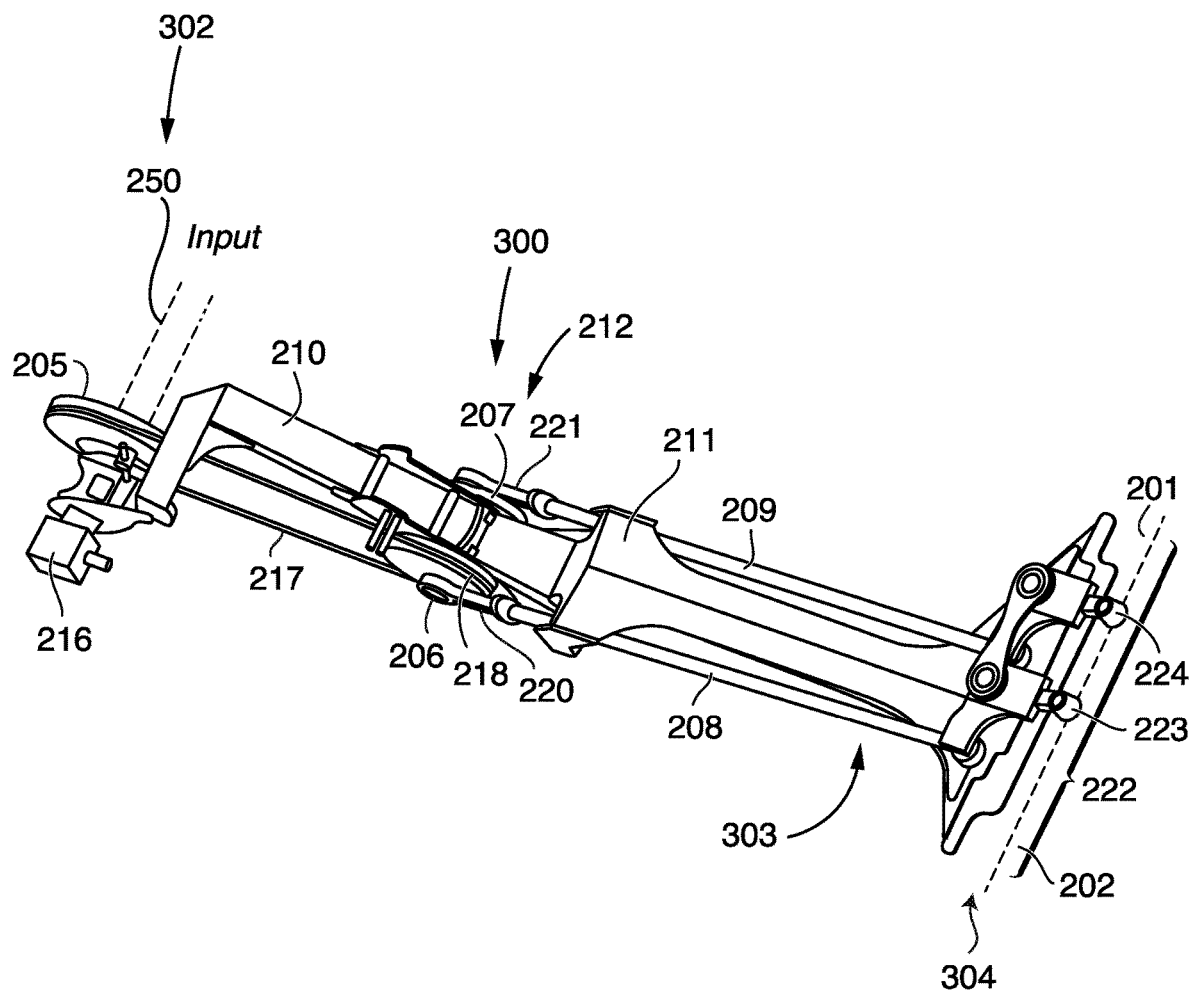
FIG. 5 is a top perspective view of the knife drive assembly of FIG. 4.
Figure 6:
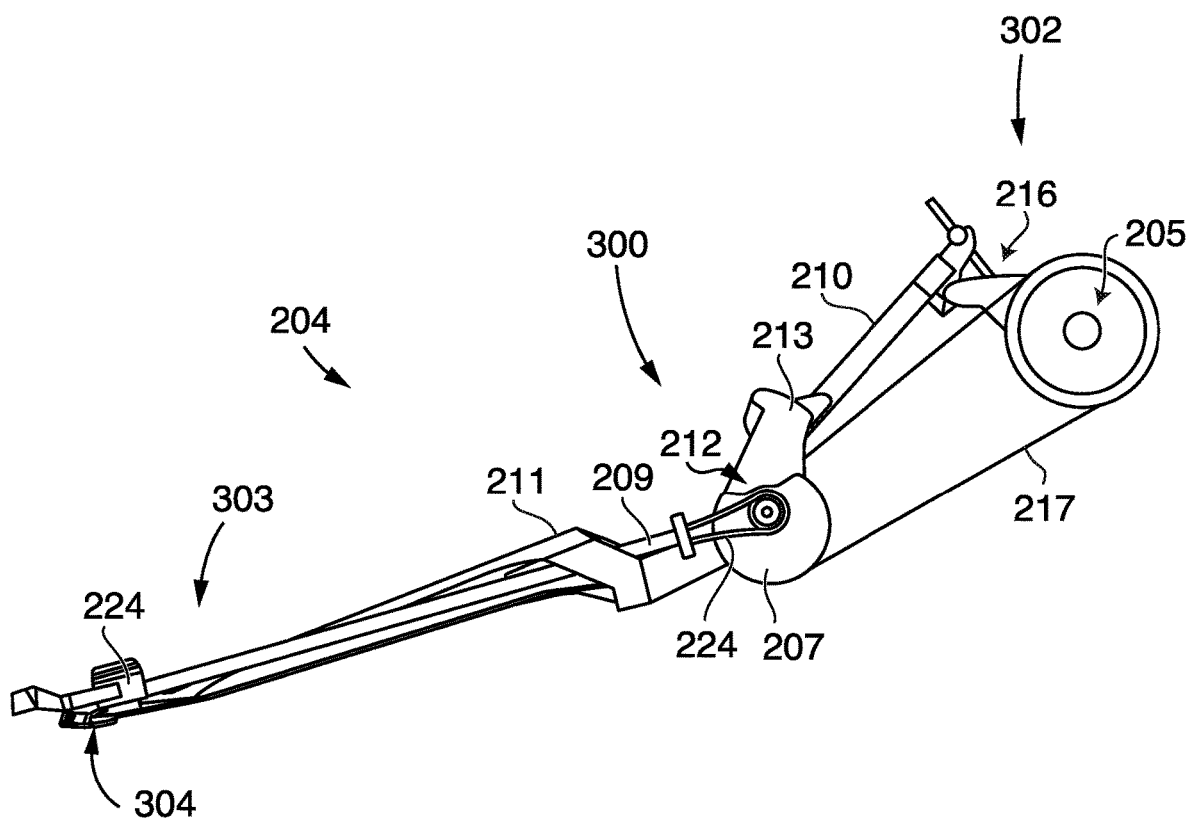
FIG. 6 is a simplified side view of the knife drive assembly of FIG. 4.

An embodiment of the knife drive assembly 204 of the present invention is shown in FIGS. 4, 5, and 6. The knife drive assembly 204 includes a drive paddle 211, which comprises the front half of the drive structure and ensures a consistent geometry of the drive package from the rotational power input to the knife head. In a flex table application, the drive paddle 211 will be pivoting structure underneath the draper deck and the connection point for the floating cutter bar. The drive paddle 211 may be manufactured in different lengths to fit different header tables, but as the drive paddle 211 is modified in length, the left and right push rods 208, 209 will also need to be modified in length.

The drive paddle 211 may be connected to a drive arm 210. The drive arm 210 may be pivotally interconnected to rotary bearing block assembly generally designated 212 for the eccentrics 206, 207 at the rear of the drive paddle 211 and have a pivot mechanism with a locking pin 213. The pivot mechanism and the locking pin 213 allow for adjustment during installation of the unitary knife drive assembly 204, to move the drive arm 210 in the various positions as dictated by the location of the combine's output shaft. Attached at the rear end 215 of the drive arm 210 is a drive pulley 205 and a belt tensioner 216 may be provided to allow for the tensioning of the drive belt 217 once the knife drive assembly 204 is mounted and appropriately positioned.

Drive pulley 205 may be coupled to the output shaft of the combine harvester—typically the right-hand output shaft in the embodiments shown. The drive pulley 205 may be sized in diameter as required to achieve the correct knife speed in comparison or ratio to the combine output shaft speed. The drive pulley 205 engages, by way of a drive belt 217, a driven pulley 218, which may be mounted with the left and right hand eccentrics 206, 207, as described below. When the input shaft from the combine applies rotational forces to the drive pulley 205, the rotational forces are translated from the drive pulley 205, through the belt 217, to the driven pulley 218.

Near the pivoting point of attachment of the drive arm 210 to the drive paddle 211 is mounted a bearing through which the eccentrics 206, 207 and the driven pulley 218 can be connected. As shown in FIGS. 4 to 6, the driven pulley 218 is co-mounted, geometrically inside or closer to the drive arm 210, to the right eccentric 206. The right eccentric 206, as will be understood to those skilled in the art of mechanical design, may be a round gear (or the like) with a rotational attachment point to which an item can be rotatably attached for the delivery of eccentric motion as the eccentric 206 is rotated. The right eccentric 206 and the driven pulley 218 need to be mounted such that the drive belt 217 does not inhibit the rotation of the right eccentric 206 or movement of the attached right push rod 208, and vice versa. Attached on the opposite side of the drive arm 210, coaxially with the driven pulley 218 and the right eccentric 206, is a left eccentric 207.

Attached to the right eccentric 206 is a right push rod 208, which extends forward along the length of the drive paddle 211 towards the knife head attached thereto. Similarly attached to the left eccentric 207 is a left push rod 209, which similarly extends forward along the length of the drive paddle 211 towards the knife head thereof. In the embodiment shown in FIGS. 3 to 6, right and left push rods 208, 209 are actually attached to their respective eccentrics 206, 207 by a right connecting rod 220 and a left connecting rod 221, respectively. Connecting rods 220, 221 connect directly to the journal on the eccentrics 206, 207 to provide a stable point of rotation on one end and a fixing point for the respective push rods on the other end. It can be seen in FIGS. 4 to 6, that drive paddle 211 provides a retainer of sorts for the right and left push rods 208, 209, as they are each moved by the respective eccentrics 206, 207.

At the distal end of the drive paddle 211, there is a knife end portion 222, which is the portion of the overall drive assembly 204 that connects to the bifurcated knife assembly sections 201, 202. As can be seen, the right push rod 208 is connected to a right bell crank 223 on the knife end portion 222. Bell crank 223 converts the fore and aft motion of the right push rod 208 into a left and right motion at the knife end 222. In the embodiment shown, the bell crank 223 pivots on cartridge bearing. Similarly, the left push rod 209 is connected to a left bell crank 224 on the knife end 222, which will convert the fore and aft motion of the left push rod 209 into a left and right motion at the knife end 222. In the embodiment shown, the bell crank 224 pivots on cartridge bearings. As outlined elsewhere herein, the eccentrics 206, 207 will be aligned in relation to each other and attached to their respective push rods 208, 209 in such a way that the left and right motion at the left bell crank 224 will be approximately equal and opposite to the left and right motion at the right bell crank 223.

The right bell crank 223 will be connected to a right-hand bifurcated knife section 201, and the left bell crank 24 will be connected to a left-hand bifurcated knife section 202. Various precise means and connection of such cranks or similar motion conversion apparatus to the bifurcated knife sections 201, 202 will be understood by those skilled in the art.

Dependent upon the size of the drive pulley 205, more or less adjustment may be required to put the required tension on the drive belt 217. One size of drive belt 217 can be used for all applications so the range of adjustment of this belt tensioner is quite wide. If it was alternatively desired to use belts that were closer in size to the combination of pulleys etc., changing the drive belt 217 could also result in the functional need for less ability to tension the belt 217.

Synchronized Drive of Two Knives:

As is outlined elsewhere herein, bifurcating the knife on the harvesting header 203 into two knife assembly sections 201, 202 of similar length, and consistently applying equal and opposite reciprocal movement to each of those two knife assembly sections 201, 202 is a key element of the present invention. Translation and transmission of eccentric movement, 180° out of phase, to the two knife assembly sections 201, 202 from the rear of the table, can be done in a number of different ways by those skilled in the art of mechanical design. It will be understood that all such modifications or different approaches to achieving the same objective will be understood by those skilled in the art to be within the scope of the present invention.

Weight Distribution:

The knife drive assembly 204 of the present invention may improve the weight distribution of assembled harvesting header 203 compared to prior art knife drives. Knife drive assembly 204 is unitary and simpler in construction; thus, with the drive assembly 204 is light and can be mounted relatively close to the center line of the harvesting header 203. The unitary construction has less weight to throw the harvesting header 203 off balance, and applies less torsional stress on the mounting hardware of the harvesting header 203 to the combine (or other power unit). The knife drive assembly 204, such as is disclosed herein, is mounted in proximity to the center line of a harvesting header 203 and provides opposed reciprocal movement to the bifurcated knife sections 201, 202 at the front of the header table. Accordingly, overall weight of the harvesting header 203 may be reduced and the distal weight at the distal end of the harvesting header 203 may also be reduced.

In addition to reducing the weight of the harvesting header 203 at the distal ends of the table, by moving the heavier components of the knife drive assembly 204 to the rear (inward side) of the table, the weight of the drive assembly 204 at the cutter bar may be reduced.

Single Part Knife Speed Adjustment:

Knife drive assembly 204 may allow for optimizing the knife speed for a wide range of applications. For example on different combines, the output shaft to which the knife drive assembly 204 can be coupled can have different output shaft speed. Center mounted knife drive assembly 204 allows for accommodation of varying output shaft speeds without the need to significantly alter the knife drive assembly 204. In this particular embodiment, the drive pulley 205 can be changed—varied in diameter—according to the common output shaft speed, in order to accomplish the desired gearing ratio and to achieve the desired knife speed. It may be sufficient to adjust the primary drive belt 217 (by tensioning or loosening the drive belt 217) to accommodate the variation in the diameter of the drive pulley 205. Accordingly, the same drive belt 217 may be used for different output shaft speeds. As will also be understood to those skilled in the art, drive arm 210 may also be adjusted to allow for modification or positioning of the drive pulley 205 in an optimal location for improved alignment with the combine output shaft. Providing an adjustable drive arm 210, in conjunction with the belt tensioner 216 and other related components, results in the ability to provide an angle adjustment to the positioning of the drive pulley 205 for optimal alignment with the combine output shaft.

Low Profile at Cutter Bar:

One of the additional key benefits of the present invention is that knife drive assembly 204, when deployed on either a rigid or a flex table, does not interfere with crop flow through and over the knife onto the draper to the same extent as a least some known knife drive assemblies. With a very low profile at the cutter bar, the present invention allows for a normal skid plate profile under the cutter bar which means the knife itself can be positioned as low as possible to the ground to perform at or near the ground in flex cutting mode. In addition to being deployable very close to the ground by virtue of the low skid plate profile, knife drive assembly 204 also allows for a low profile above the cutter bar guards, lower than the draper deck, which is needed to facilitate the crop flow onto the draper after cutting. The low profile at the cutter bar of knife drive assembly of the present invention relative to the other components of header 203, can be observed in the embodiment shown in FIGS. 4 through 6.

Floating Assembly for Flex Table:

Many harvesting headers deploy what is referred to as a flex table design, in which portions of the draper deck or the cutter bar float or flex relative to the header frame to accommodate deviations in the crop surface. Knife drive assembly 204 could be manufactured to accommodate a flex table design and with a flex table design coupled with the low profile provided at the front of the draper deck and in relation to the cutter bar benefits may be obtained and is one of the key benefits of the present invention.

Reduced Mass at Distal Ends of the Header:

Since the mechanical drive elements for the knife drive assembly 204 are located at or proximate the transverse center of the header table 214, the remainder of the mass and the end struts of the header 203 can be reduced in width and mass for optimal crop dividing performance. Positioning of knife drive assembly 204 at or proximate the center of the table eliminates the requirement for wide end struts on the header to encompass a drive assembly. A narrow end strut reduces the impact of the strut on the crop outside the range of the cutting knives as less crop material is damaged as the structure is pushed through it. Knife drive assembly 204 may allow for a header table to have the absolute minimum structural width required for the end struts to be reliable and stable.

Header with Dual Reciprocating Knife Sections:

A harvesting header such as header 203 which employs a center mounted low-profile knife drive assembly 204, and provides fully synchronized and 180° out of phase movement of two bifurcated knife assembly sections 201, 202 is contemplated within the scope of the present invention. Rotational force from the combine is translated and applied to the left and right eccentrics 206, 207. The left and right pushrods 208, 209 (interconnected to eccentrics 206, 207), in conjunction with low-profile bell crank devices 223, 224 attached to the bifurcated knife sections 201, 202, can result in the two knife assembly sections 201, 202 traveling in equal and opposite directions.

The deployment of the knife drive assembly 204 and dual reciprocating knife assembly sections 201, 202 in accordance with the present invention, could be modified for use on many different types of harvesting header designs. It will be understood that all such modifications to implement the present invention in those type of headers are all contemplated within the scope of the present invention would not be conceived to depart from the general scope and intention hereof.

By way of overview with reference again to FIGS. 3 to 6, a first force and movement conversion mechanism designated 300, is operable to convert a rotational force from a rotational power source 302 (such as the output shaft 250 (FIG. 4) provided on a propulsion unit 10 of a piece of agricultural equipment such as a combine harvester or swather (FIG. 1) to drive at least one longitudinally moving member (such as push rods 208, 209) in reciprocating longitudinal movement. A second force and movement conversion mechanism 304 is operable to convert the reciprocating longitudinal movement of the at least one longitudinally moving member to drive at least one knife (such as the knives and knife blades in knife assembly sections 201 or 202) in transverse reciprocating movement that may be substantially perpendicular to the longitudinal reciprocating movement.

With reference to harvesting header 203, knife drive assembly 204 is configured to receive rotational power from rotational power source 302 such as the power take off shaft 250 of a propulsion unit 10 of a piece of agricultural equipment. Knife drive assembly 204 is operable and configured to convert the rotational power and force from the rotational power source into longitudinal reciprocating motion of the push rods 208, 209, and to translate the longitudinal reciprocating motion of the push rods 208, 209 into transverse reciprocating motion. The knife drive assembly 204 is further configured and operable to utilize the transverse reciprocating motion to drive one or more knives (e.g. knife assembly sections 201 and 202) in transverse reciprocating motion (as shown by arrows A and B in FIG. 3). The transverse moving and oriented knives/knife assembly sections 201, 201 can be used to cut crops in a field when the header 203 is moved in a longitudinal direction in the field by a propulsion unit 10.

Figure 7:
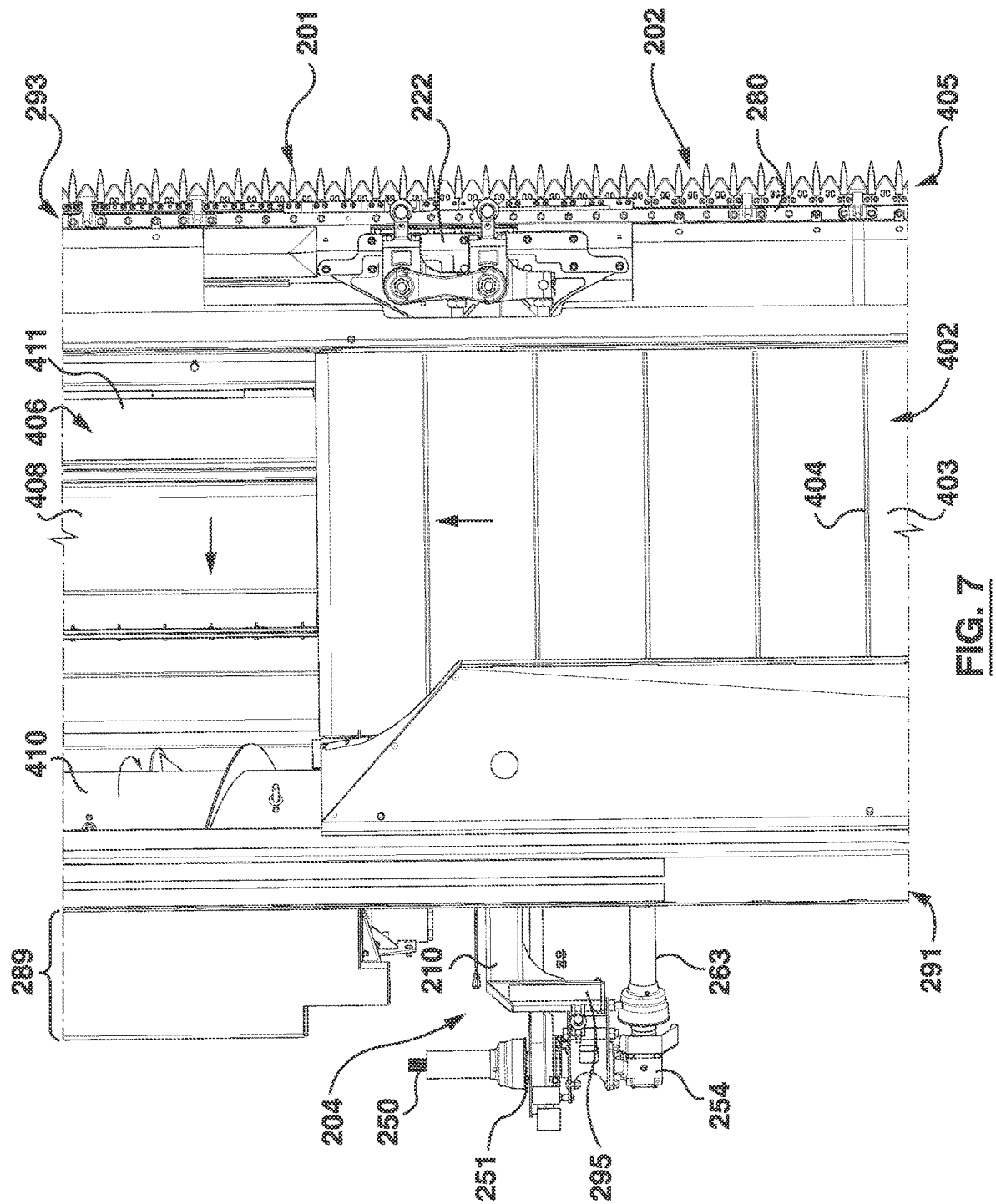
FIG. 7 is a detailed top plan view of part of a harvesting header deploying the knife drive assembly of FIGS. 4 to 6.
Figure 8:
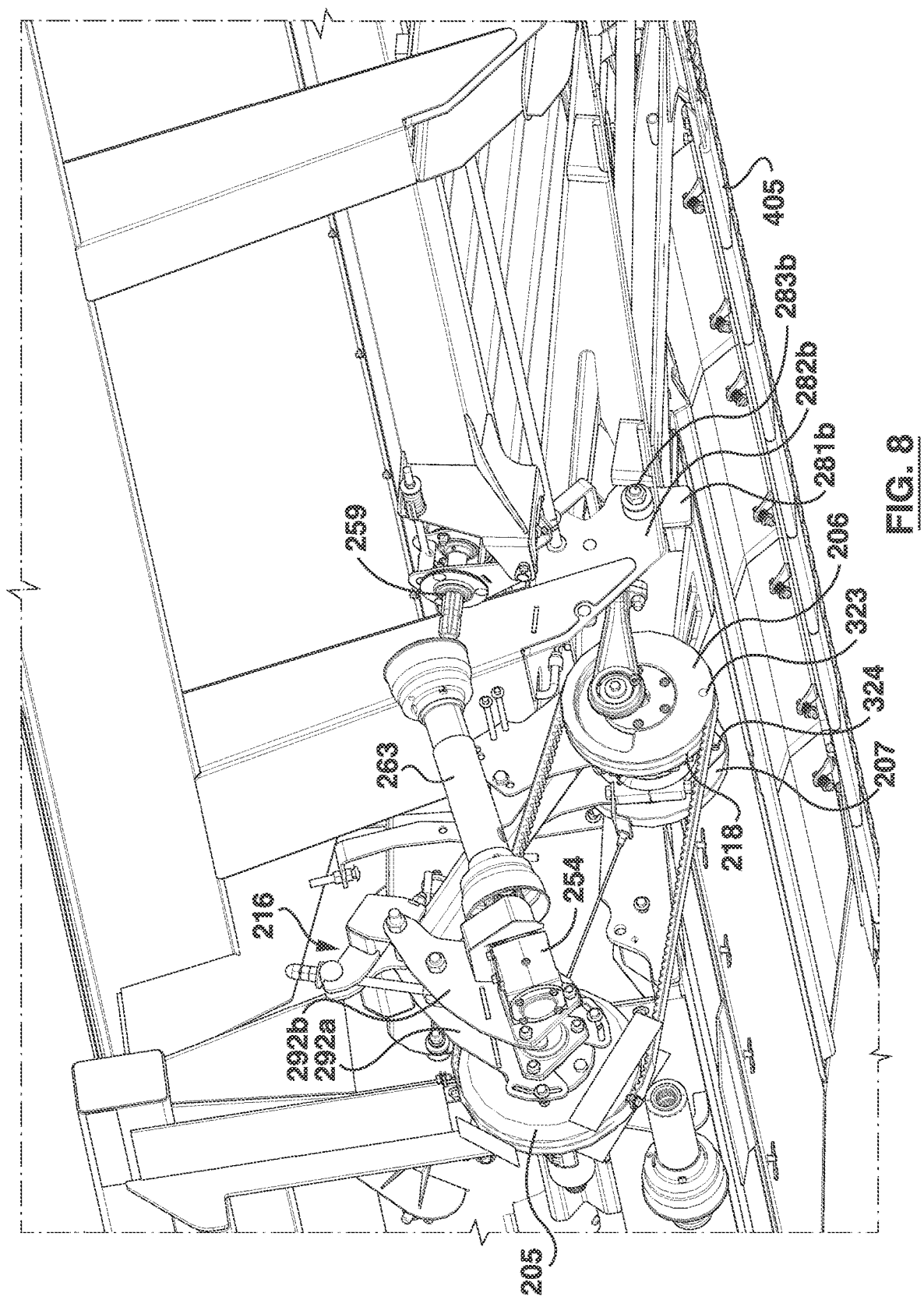
FIG. 8 is a lower right side perspective view of a portion of the harvesting header of FIG. 7 including the knife drive assembly of FIGS. 4 to 6.

Now with reference to FIGS. 7 to 16, additional details of the construction and operation of a harvesting header 203 and its knife drive assembly 204 are provided. As indicated above, knife drive assembly 204 may include drive pulley 205, eccentrics 206, 207, push rods 208 and 209, bell cranks 223 and 224, and knife assembly sections 201 and 202 that have at least one knife blades and typically a plurality of transversely oriented blades. Drive pulley 205 is connected to an output shaft 250 from a piece of equipment such as the propulsion unit 10 of a combine harvester or swather (FIG. 7). Output shaft 250 is configured to interface and couple with drive pulley 205 and is and operable to drive pulley 205 in rotation about a pulley shaft 251 having an axis, with the shaft 251 being mounted and held in a suitable bearing device. Pulley shaft 251 passes through drive pulley 205 and extends into a gear box 254. Output shafts 250 and 263 may each be configured as telescopic slip shafts that will allow for a limited amount of relative movement laterally and longitudinally if and when knife drive assembly 204 moves relative to the output shaft 250 of the combine and input shaft 259, to accommodate some mis-alignment that may occur during operation. Gear box 254 converts the transversely oriented rotation of shaft 251 to the rotation of output drive shaft 263 oriented in a longitudinal direction. With reference to FIG. 8, output shaft 263 may be operably coupled to input shaft 259. Input shaft 259 may be connected to a drive mechanism for a draper canvas 403 of a draper assembly 407.

Eccentric 206 is coupled to the drive pulley 205 by a drive belt 217 and receives the rotational power from the rotational power source through the drive belt 217. The drive belt 217 thus rotates the eccentric 206. Push rod 208 is coupled to the eccentric 206 and receives rotational power from the eccentric 206. Eccentric 206 thus moves the push rod 208 in longitudinal motion. A bell crank 223 is coupled to push rod 208 and to the knife section 201 and receives longitudinal forces from push rod 208. Bell crank 223 converts the longitudinal forces and longitudinal reciprocating movement from push rod 208 into transverse forces and transverse reciprocating motion of knife assembly section 201, as will explained further hereinafter.

In the embodiment illustrated in FIGS. 7 to 16, the rotational power provided by an output shaft 250 can be used to transversely move both left and right knife assembly sections 201, 202. Drive pulley 205 is coupled to a rotary bearing block assembly 212 that includes left and right eccentrics 207, 206 mounted for rotation on a common axle about a common transversely oriented axis. Drive belt 217 thus rotates both the right and left eccentrics 206, 207. Right eccentric 206 and left eccentric 207 may be locked relative to each other to rotate 180 degrees out of phase with each other. Right and left push rods 208, 209 are coupled to the right and left and right eccentrics 206, 207 respectively. Left eccentric 207 moves the left push rod 209 in longitudinal reciprocating motion, and the right eccentric 206 moves the right push rod 208 in longitudinal reciprocating motion. Right and left bell cranks 223, 224 are coupled to outward end portions of the right and left push rods 208, 209, respectively, and receive alternating longitudinal forces from the push rods 208, 209, respectively. The right and left right bell cranks 223, 224 translate the longitudinal alternating forces into transverse alternating forces causing transverse reciprocating motion of the right and left knife assembly sections 202, 201, respectively.

The rotational power that is converted to reciprocating longitudinal movement of the push rods 208, 209 may be operable to move right and left knife assembly sections 202, 201 respectively in opposing transverse reciprocating motion by maintaining the left and right push rods 208, 209 in an out-of-phase relationship. For example, left push rod 209 may be coupled to the left eccentric 207 at a nominal 0 degrees, and right push rod 208 may be coupled to the right eccentric 206 at 180 degrees out of phase relative to left push rod 209. Left and right push rods 208, 209 would thus move in longitudinal movement at 180 degrees out-of-phase relative to one another. Such an arrangement helps to reduce vibrations associated with transversely moving the knife sections 201, 202 due to operating in equivalently opposite directions. Vibrations produced by movement of the left and right eccentrics 207, 206, the left and right push rods 209, 208, and the left and right knife assembly sections 201, 202, will cancel out, or at least be substantially reduced. Reduced vibrations are expected to enhance both reliability (less downtime and less maintenance) and also increase operator comfort during use.

More details of knife drive assembly 204 are now provided with reference to FIGS. 3, and 7-9. FIG. 3 illustrates a schematic view of the bottom of the harvesting header 203 deploying the knife drive assembly 204. The width 'W' of the harvesting header 203 in a transverse direction is defined by the spacing of end struts 290, and may in many example embodiments range from 30 feet to 45 feet. Also shown in FIG. 3 is the center line 'CL' of the harvesting header 203, which is at the halfway point of the transverse width of the harvesting header 203.

Figure 7A:
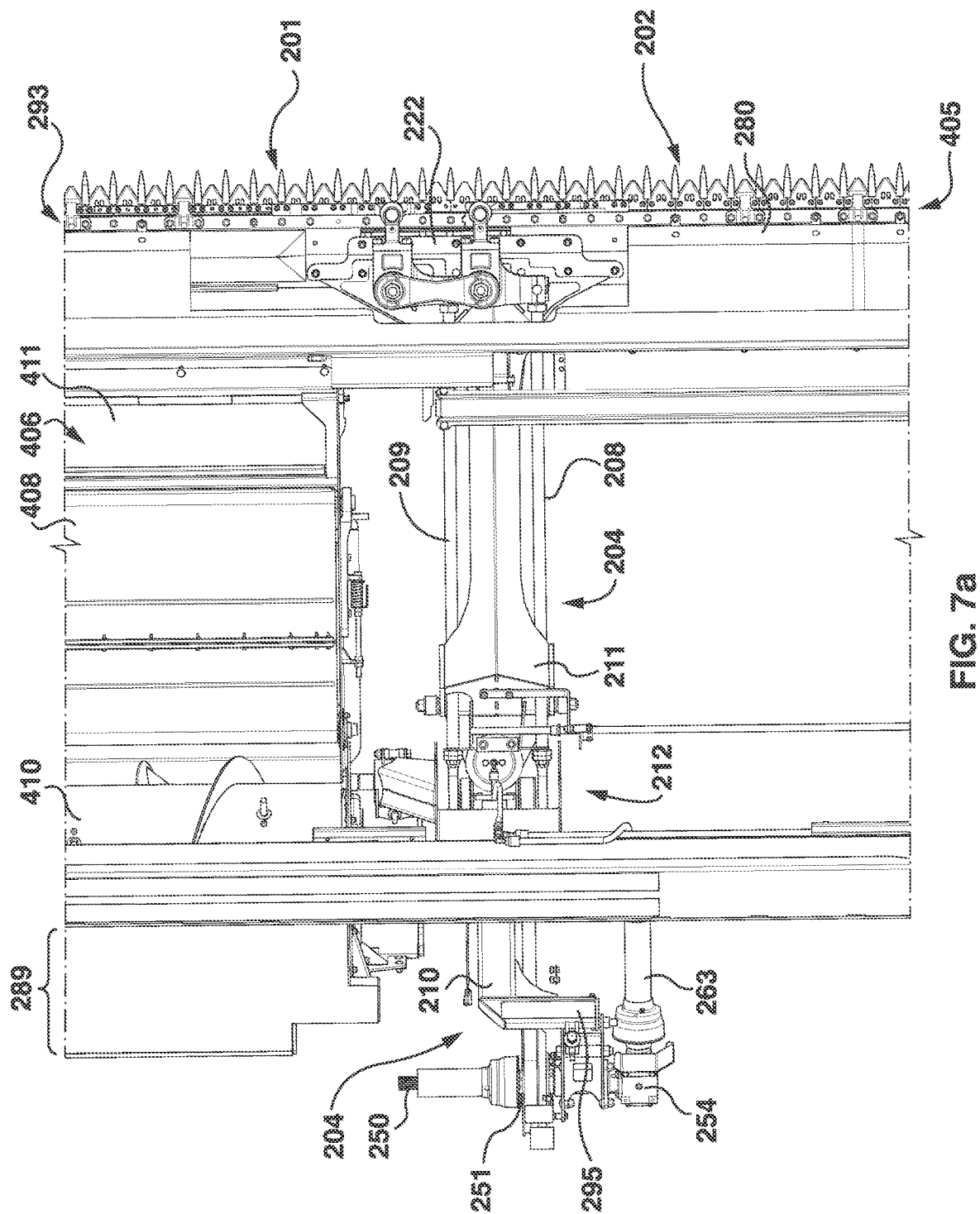
FIG. 7A is a similar top plan view as FIG. 7, but with some parts of the harvesting header removed for illustrative purposes.

Knife drive assembly 204 generally extends from an area proximate inner transverse side 291 of the header 203 to an outward side 293 of the harvesting header 203 (as shown for example in FIG. 3 and in FIG. 7A). In one embodiment (not shown), knife drive assembly 204 extends substantially along or transversely straddles to some extent the longitudinal center line CL of the harvesting header 203. In other embodiments, knife drive assembly 204 extends longitudinally but is entirely spaced transversely a relatively short distance to one side of the center line CL of harvesting header 203 (i.e. either to the right or left of the center line).

Knife drive assembly 204 may include a longitudinally extending drive paddle 211 and a longitudinally extending drive arm 210 each of which may be made from one or more suitably strong materials such as steel. Drive paddle 211 and drive arm 210 may be fixedly or pivotally inter-connected to each other at adjacent or overlapping end regions, interconnected with rotary bearing block assembly 212 as will be explained further hereinafter. Drive arm 210 may have an integrally formed, transversely extending, support plate region 295. Support plate region 295 may have a pair of spaced, orthogonal plate extension portions 294a, 294b (see FIGS. 13 and 14) that may be interconnected to a pair of extension plates 292a, 292b with a bolt 320 passing through apertures in plates 292a, 292b, 294a, 294b and being held in place by a nut 321. Plates 294a, 294b may pivot relative to plates 292a, 292b and may be used to support gear box 293, shaft 251, drive pulley 205 and output shaft 263 (see FIGS. 8, 13 and 14). The ability to pivot plates 294a, 294b relative to plates 292a, 292b can also facilitate adjustment of the tension/tightness of drive belt 217 depending upon the size of the drive pulley 205 that is being utilized. It will be noted that this assists in enabling knife drive assembly 204 to be readily configured/modified to fit one of several different types/brands/models of combine harvesters or other pieces of agricultural equipment by being able to easily vary the size/diameter of the drive pulley 205 that is employed.

The longitudinally outward end of knife drive assembly 204, and in particular the outward knife end portion 222 of drive paddle 211, is mounted to the cutter bar assembly 405 by securing a transversely extending cutter bar mounting plate portion 279 of drive paddle 211 (that may be integrally formed at the outward end of drive paddle 211) near the outward side 293 of the header 203 directly to a cutter bar 280 (FIGS. 7 and 7A) by nuts/bolts 297 or other releasable attachment mechanisms. Thus, knife drive assembly 204 can be supported on header 203 at a first location, proximate cutter bar assembly 405.

Figure 9:
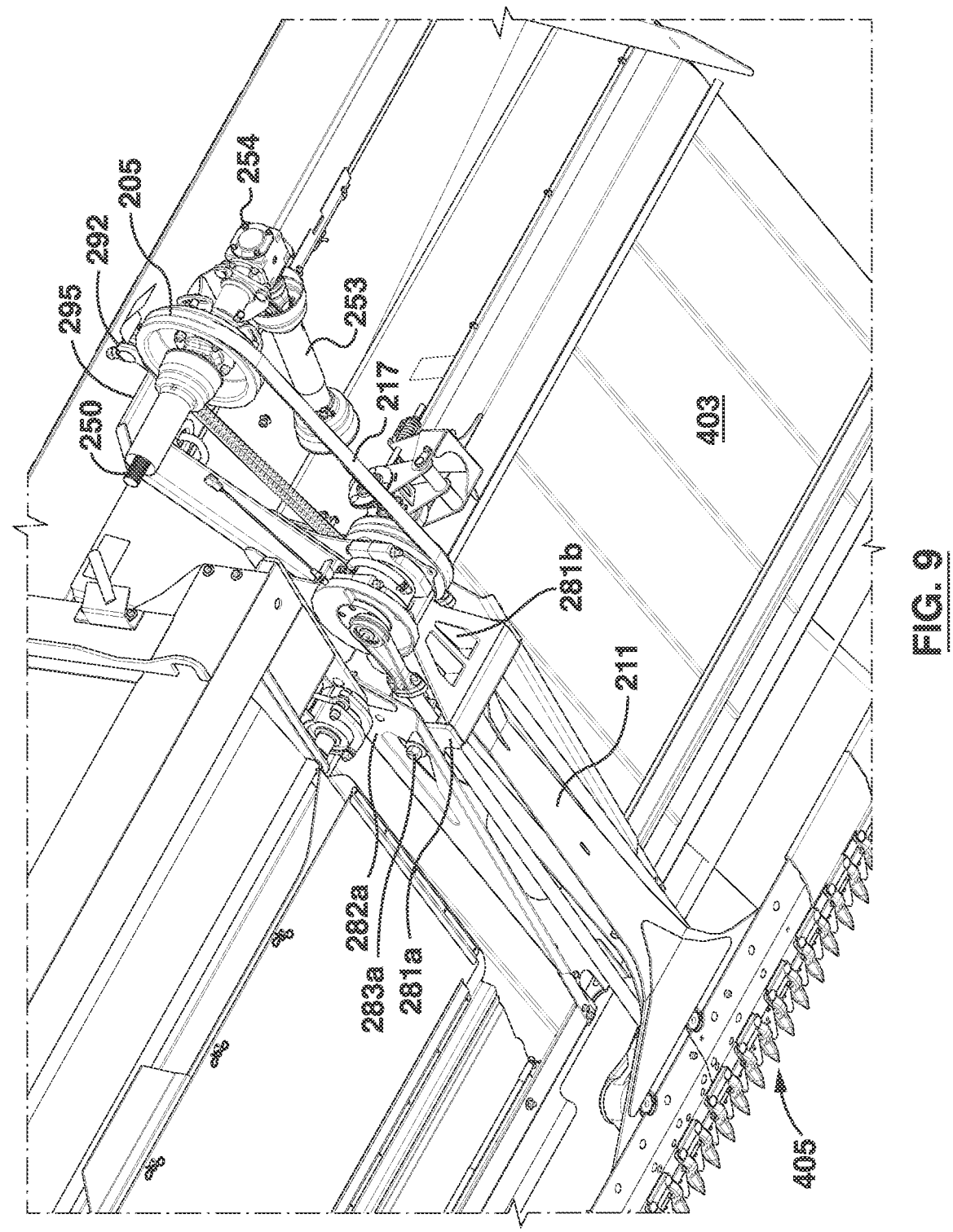
FIG. 9 is a lower left side perspective view of the portion of the harvesting header shown in FIG. 8.

Knife drive assembly 204, and in particular drive paddle 211, may also be supported at a second location at a longitudinal distance from the cutter bar 280 towards the inward side 291 of the header 203 by securing drive paddle 211 to elements of the support frame of header 203. With particular reference to FIGS. 8 and 9, drive paddle 211 may be an entirely rigid portion of the support frame (which also includes drive arm 210) that supports components of knife drive assembly 204. The parts forming drive paddle 211 may be fixedly interconnected to each other such as for example by welding. Drive paddle 211 may include a pair of laterally spaced part, parallel and longitudinally oriented plates 281*a*, 281*b* which may be attached such as with releasable bolts 283*a*, 283*b* (FIGS. 8 and 9) to corresponding frame strut plates 282*a*, 282*b* that form part of the header frame supporting sub-structure. Drive paddle 211 can also pivot on and relative to frame strut plates 282*a*, 282*b* about a transverse axis defined by transversely oriented bolts 283, 283*b*. Pivoting drive paddle 211 is required on a so-called flex table or draper where the cutter bar assembly 405 will move vertically up and down independently of the header frame. On a flex draper table header, it can be expected that there may be a relative movement of up to 9 inches of the cutter bar 280 up and down relative to the support fame of header 203. A limiting strap (not shown) may be provided proximate the outward end of drive paddle 211 attached to a strut forming part of the header frame and may attach to the outward end of drive paddle 211 with a pin. The limiting strap may be provided to limit the range of movement of the end of paddle 211 to a maximum of 9 inches from the frame strut. The pivot connection of the drive paddle 211 will permit knife drive assembly 204 as a whole to be re-oriented as the cutter bar 280 moves up and down relative to the frame of the header 203. In operation, drive arm 210 will be fixedly connected to drive paddle 210 and so when drive paddle 211 pivots at this second location, then so will drive arm 210 also pivot. However, since the length of drive arm 210 is typically much shorter than the length of drive paddle 211, the inward end of drive arm 210 where the connection to output shaft 250 is located will not rotated by such a great distance (eg. about less than half—such as only 4 inches maximum). This amount of pivoting movement of drive arm 210 can be accommodated at the inward end of drive arm 210.

In a rigid table header, there will be substantially no relative upward/downward movement of the cutter bar 280 relative to the frame of the header and so there will be substantially no relative pivoting of the drive paddle 211 relative to frame strut plates 282*a*, 282*b* about the transverse axis defined by transversely oriented bolts 283, 283*b*.

The result of the foregoing construction of knife drive assembly 204, is that when it is desired to remove or install a knife drive assembly 204 from header 203 this can be accomplished in a relatively easy manner by releasing/attaching bolts 297*a/b*, 283*a/b* at these two locations of drive paddle 211, so that knife drive assembly 204 can be removed/installed as a complete single unit. The removal process would also include disconnecting the drive shafts 250 and 263 and the outer end of the drive paddle 211 will be disconnected (such as being unbolted) from cutter bar assembly 405.

When knife drive assembly 204 is detached from header 203, it can be properly set up including providing the necessary timing adjustments that may be required to ensure the correct operation of knife drive assembly 204 as explained herein, including the appropriate timing adjustments to the strokes of the eccentrics 206, 207 and their push rods 208, 209. Typically, no further adjustments of timing of the eccentrics 206, 206 and their respective push rods 208, 209 is required, once the knife drive assembly 204 has been installed on header 203. With respect to setting the proper timing adjustment, it will be noted in particular in FIG. 13 that eccentric 206/driven flywheel pulley 218 and eccentric 207 have transverse apertures passing there through. A corresponding aperture 324 through an extension plate 325 that is part of rotary bearing assembly 212 may also be provided, such that if a pin is passed through each of the apertures 323 in eccentric 206/driven flywheel pulley 218 and eccentric 207 and through aperture 324 in plate 325, then a person will know that the timing of the relative rotations of the eccentrics 207, 208 is correct. To complete the timing adjustment, a person can, with front faces of the bell cranks 223, 224 and their respective knife bearing heads 225, 226 being parallel and aligned with each other, the outward ends of push rods 208, 209 can be threaded inwards/outwards until there is a snug fit. This will set the timing on all components from the eccentrics 206, 207 to the knife bearing heads 225, 226.

With particular reference again to FIGS. 7 and 7A, header 203 may also include draper deck assembly 402 (sometimes also referred to as a draper table) and cutter bar assembly 405, both of which may be mounted in a conventional manner to the frame of the header 203. As can be seen in FIGS. 7 and 7*a*, some sub-frame components (collectively numbered 289) extend transversely and may provide at least partial support draper deck assembly 402. Draper deck assembly 402 may include rollers such as roller 409 (see FIG. 13) mounted in a conventional manner to support a draper canvas 403. Draper canvas 403 may include transverse slats 404. FIG. 7A shows part of harvesting header 203 without the draper canvas 403 to illustrate the entirety of knife drive assembly 204, which lies underneath draper table 402, and extends from the inward side 291 of header 203 to the outer side 293 of header 203.

Figure 12:
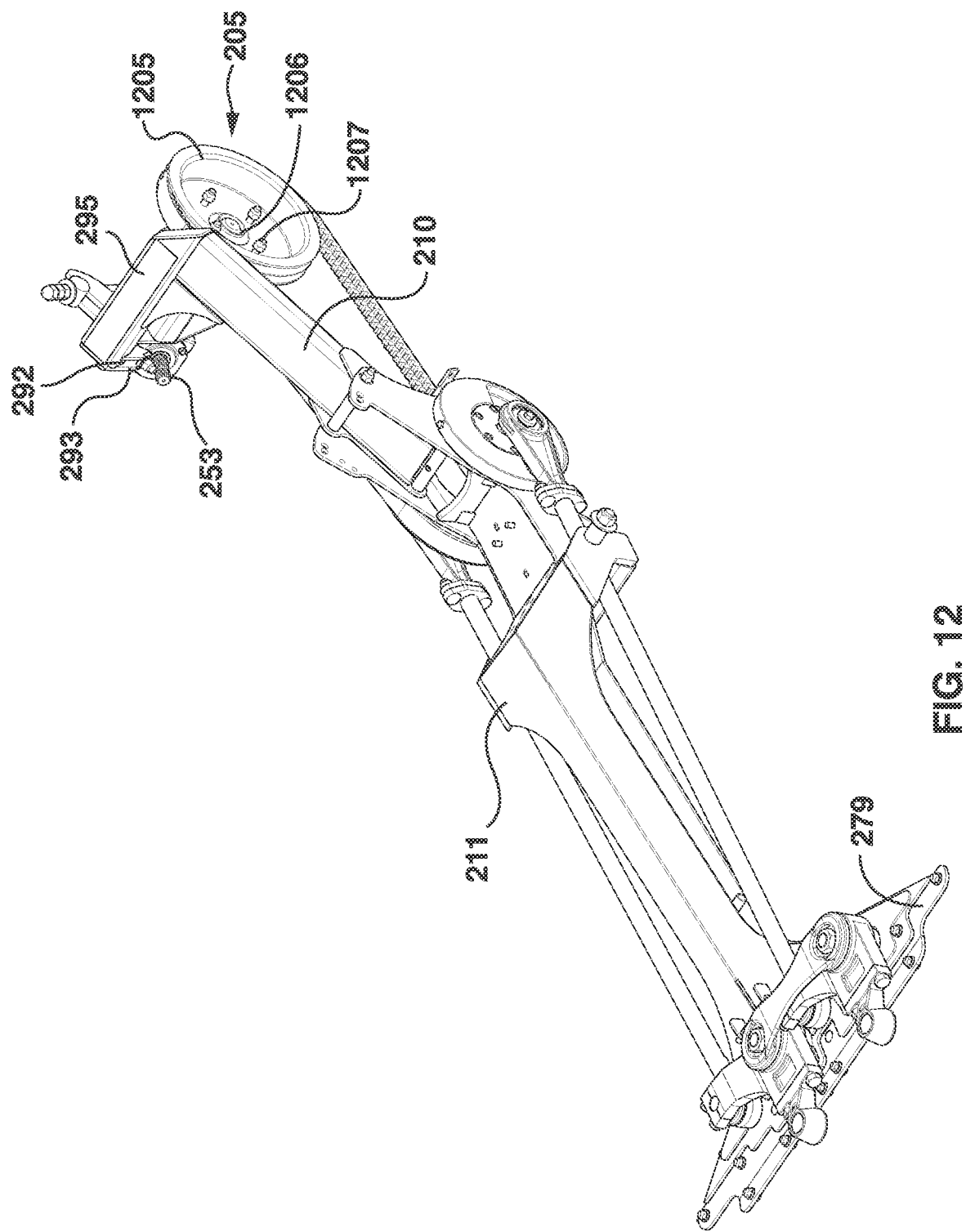
FIG. 12 is a front left side perspective view of various components of the knife drive assembly of FIGS. 4 to 6.
Figure 13:
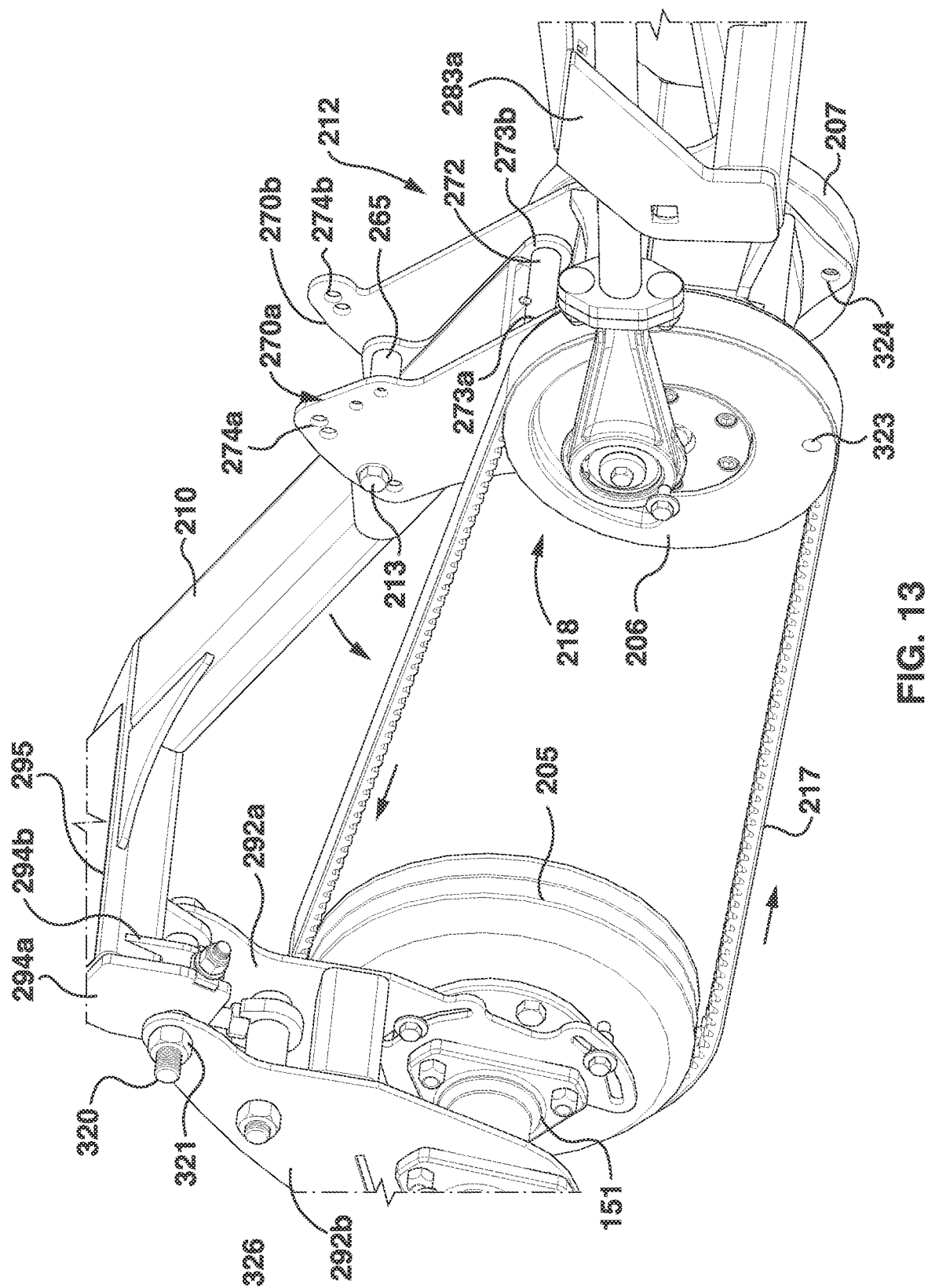
FIG. 13 is an enlarged front perspective bottom view of several components of the knife drive assembly of FIGS. 4 to 6.
Figure 14:
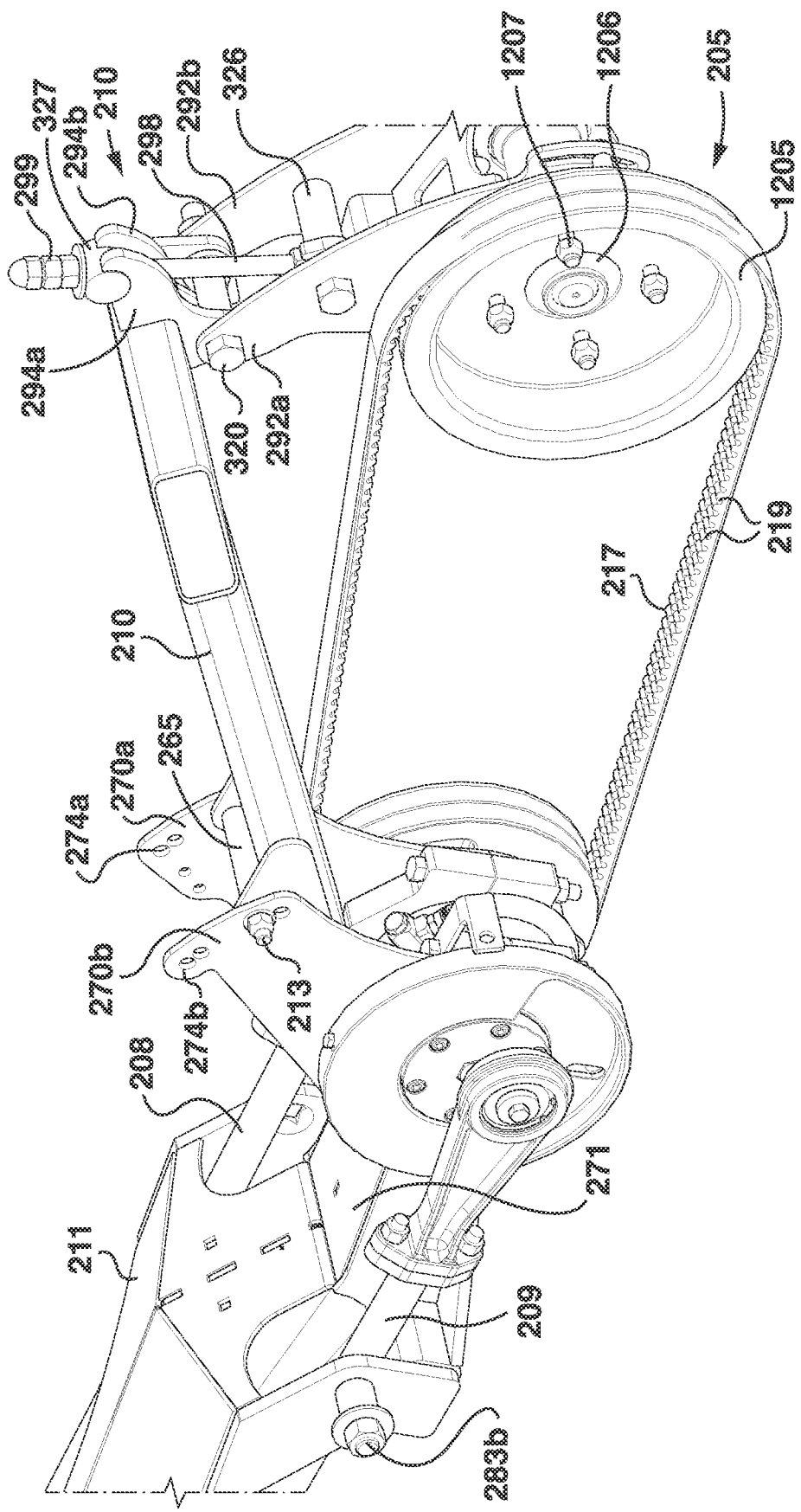
FIG. 14 is an enlarged rear perspective view of some of the components of the knife drive assembly as shown in FIG. 13.

With reference again to FIGS. 1 and 4-6, output shaft 250 from the propulsion unit 10 (FIG. 1) may be oriented generally perpendicular to knife drive assembly 204. Output shaft 250 has a proximal end attached to drive pulley 205 (e.g. by quick release splines, a nut and bolt, or by other attachment means known in the art) and a distal end configured to couple drive pulley 205 to output shaft 250. With reference to FIGS. 12 and 14, drive pulley 205 may comprise an outer drive disc portion 1205, which may be bolted to a cylindrical hub section 1206. Hub section 1206 may be fixedly attached to shaft 251 and rotate with shaft 251, which may be supported by bearings (not shown but included in the gearbox). Outer disc section 1205 may be made from a relatively soft metal material such as grey iron casting material whereas inner hub section 1206 may be made from a stronger material such as a strong steel. This can permit the larger diameter portion of the drive shaft 205 to dampen vibrations, while the central hub portion has the enhanced strength of a material like steel, and which also allows it to act a suitable bearing surface.

Drive pulley 205 is operably coupled to output shaft 250. This may be accomplished for example as follows: Output shaft 250 may be provided with a flange that may be bolted on the connection side to drive pulley 205. On the side connecting to the propulsion unit 10, there may be provided a splined shaft with a quick connect coupler, of the type known in the art. It should be noted that the connection of shaft 250 to drive pulley 205 may be the only connection that includes bolts. The other shaft connections may be spline shaft quick coupler connections. Such connections provide ease of service and also permit some degree of flexibility since they may be telescopic to allow for adjustment/limited movement.

Output shaft 250 is thus configured and operable to couple drive pulley 205 in rotation about shaft 251, which passes through drive pulley 205 and extends into a gear box 254. Gear box 254 converts the transversely oriented rotation of shaft 251 to the rotation of an output drive shaft 253 oriented in a longitudinal direction. With reference to FIG. 8, output shaft 253 may be operably coupled to input shaft 259. Input shaft 259 may drive a drive mechanism for a draper canvas 403 of a draper assembly 407.

As indicated above, also included as part of harvesting header 203 is draper table 402. In one example embodiment, draper table 402 has a draper canvas 403 made of rubberized polyester and has a width of about 42 inches. The draper canvas 403 has slats 404 extending from a first end to a second end of the draper canvas 403. The slats 404 may be oriented generally perpendicular to the length of draper canvas 402. In one embodiment, the slats 404 are made of fiberglass reinforced rubber slats.

Draper table 402 collects crop material that has been cut by the knife assembly sections 201, 202. The draper table 402 is also divided into two transverse sections. Each section moves crop transversely from the sides towards the center line 'CL' of the harvesting header 203; thereby transporting the collected crop into a table opening 406 where it can be handled by a center draper canvas 408. In addition to draper canvas 403, a second draper canvas (not shown in FIG. 7) like draper canvas 403 and supported in a similar manner, is included at the opposite side of the table opening 406, which functions in substantially the same manner as draper canvas 403 but moves the collected crop in the transversely opposite direction to table opening 406. Once the cut and collected crop reaches the table opening 406 the cut crop material can be deposited onto central draper canvas 408 which may move the collected crop inwards towards and into engagement with a central feed auger 410 for further processing into the combine harvester (not shown in FIG. 7). A transversely oriented hinged door 411 may be provided adjacent to center draper canvas 408 and can be opened and closed in order to periodically remove debris/stuck crop material in the vicinity of the center draper canvas 408.

An overview of the functions performed by knife drive assembly 204 is now provided with reference to FIGS. 4-6, showing knife drive assembly 204 detached from the harvesting header 203.

Knife drive assembly 204 may be considered to have three functional sections: (1) a rotational power interface 302; (2) a rotational-to-longitudinal force/movement converter 300; and (3) a longitudinal-to-transverse force/movement converter 304. The mechanical components corresponding to these three functional sections are positioned along the length of the knife drive assembly 204, with the rotational power interface 302 at a first end proximate the output from source of rotational drive and extend from the first end to a medial region, the components corresponding to rotational-to-longitudinal converter 300 are located in a medial region, and the components for the longitudinal-to-transverse converter 304 extend from that medial region to but are mostly concentrated at a second end of the knife drive assembly located opposite the first end and are proximate the cutter blade assembly 405.

The rotational power interface 302 includes (amongst other things) the drive pulley 205, a driven pulley 218, a drive belt 217, and a belt tensioning/adjustment mechanism 216.

With particular reference to FIG. 14, belt tensioning mechanism 216 may include a pivot mounting structure for drive pulley 205 that includes plates 292a, 292b and a pivot bolt 320. A threaded rod 298 with adjustment nut 299 forms the adjustment point and mechanism. Rod 298 is pivotally connected at one end to a pin 326 that extends between plates 292a, 292b. The opposite end of rod 298 passes through a threaded block 327 that is held between extension plates 294a, 294b. By adjusting the amount of extension of rod 298 through threaded block 327, the rotational angular position of the drive pulley 205 relative to drive arm 210 can be modified about an arc. By adjusting the angular position of the drive pulley 205 relative to drive arm 210, the tension of the drive belt 217 can be adjusted and set. Additionally, the pivoting movement of drive pulley 205 allows for drive belts to be removed/installed/replaced, including providing drive belts of different configurations/lengths.

The rotational-to-longitudinal converter 300 includes the rotary bearing assembly 212 which includes (amongst other things) the right and left eccentrics 206, 207 (which provide "Pitman eyes"), the right and left push rods 208, 209, and left and right connecting rods 220, 221 (which act as "Pitman arms").

Figure 15:
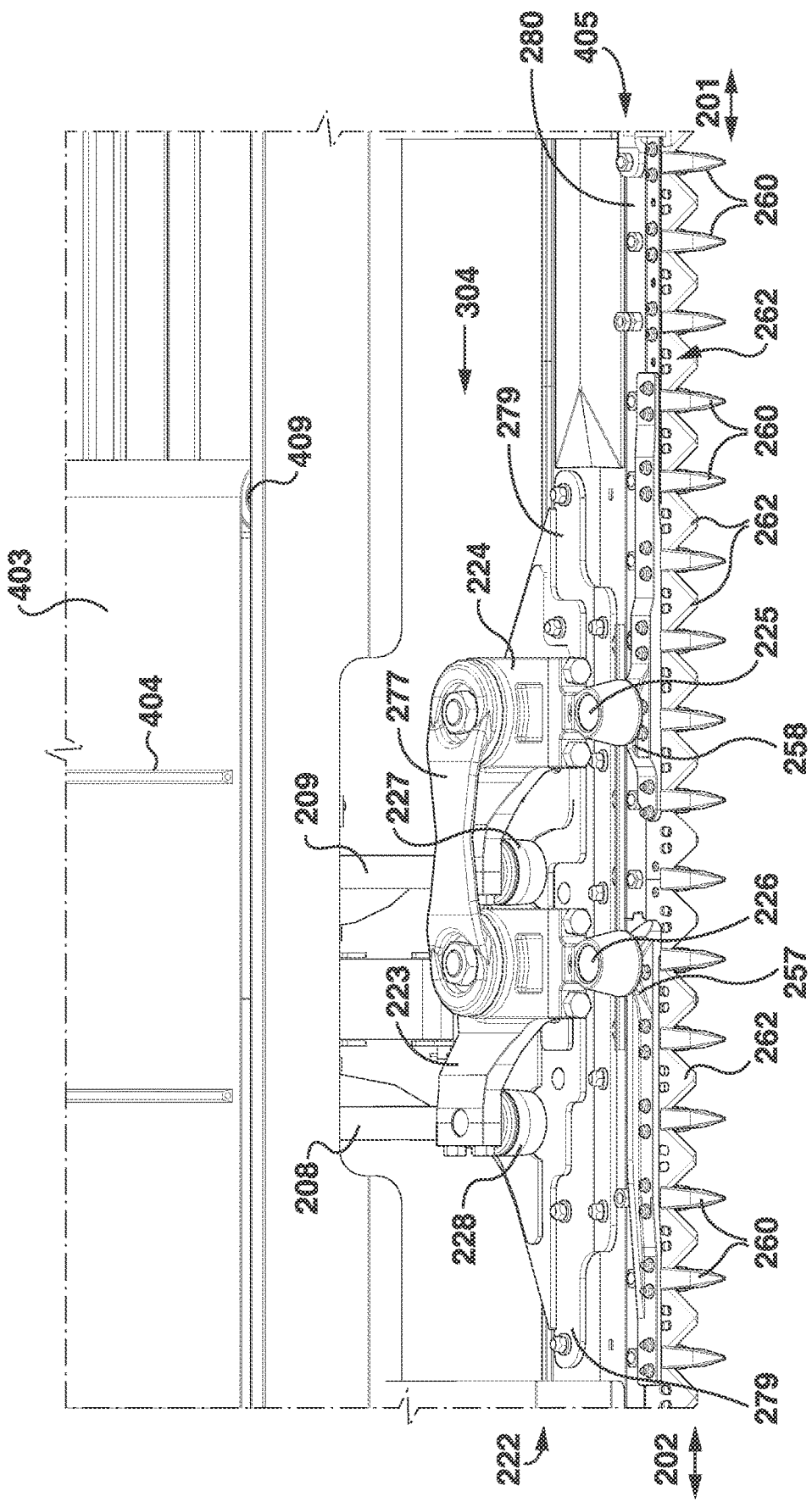
FIG. 15 is a top enlarged front perspective view of some other components of the knife drive assembly of FIGS. 4 to 6.
Figure 16:
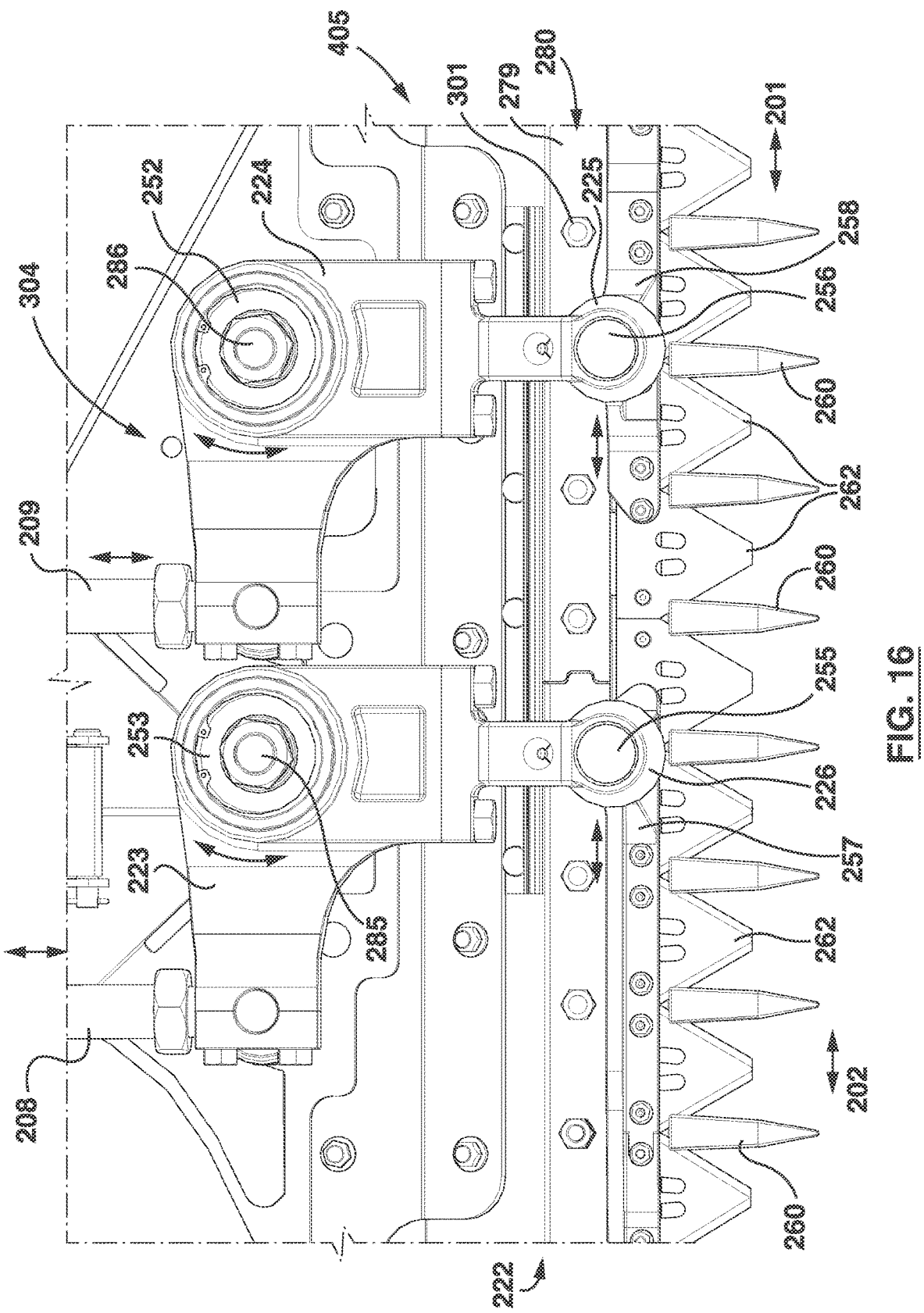
FIG. 16 is a further enlarged top view of some other components shown in FIG. 15.

With reference also to FIGS. 14-16, the longitudinal-to-transverse force/movement converter 304 also includes (amongst other things) a knife end portion 222 of the drive paddle 211, which is interconnected to components of the knife assembly sections 201, 202 such as knife head bearings 255, 256, and knife heads 257, 258. Knife end portion 222 of drive panel 211 has mounted to it right and left bell cranks 223, 224, right and left knife bearing heads 226, 225, and left and right ball joints 227, 228 (FIGS. 14-16).

Returning again to FIGS. 4 to 6, rigid drive arm 210 extends generally from a first end of the knife drive assembly 204 toward the central/medial region of the knife drive assembly 204.

At an inward end, drive arm 210 is inter-connected with drive pulley 205 as described above. At the opposite end, drive arm 210 is attached to plates 270a, 270b that are interconnected with a pivot pin connection 272 to drive paddle 211 and rotary bearing assembly 212. As is evident from FIGS. 13 and 14 in particular, a pivot pin 272 passing through plates 270a, 270b, and corresponding end flanges 273a, 273b at the end of drive arm 210 provides for a pivotal connection between drive arm 210 and paddle 211. Drive arm 210 may also be provided with a transversely oriented cylindrical tube 265 that may be attached such as by welding to an upper surface area 211a (FIG. 13) of drive arm 210. Drive arm 210 can be pivoted to, and locked at, one of several specific angular positions relative to drive paddle 211 and rotary bearing assembly 212. The specific desired operating angle of drive arm relative to drive paddle 211 and bearing assembly 212 can be selected and then locked in place by use of a locking pin 213 (FIG. 13) that may be received through one of several pairs of opposed apertures such as apertures 274a, 247b and through aligned hollow tube 265 when the tube 265 is aligned with the pair of opposed apertures. The pivoting arc of drive arm 210 relative to paddle 211 about pivot pin 272 is determined by the position of locking pin 213 as it extends between specific apertures in plates 270a, 270b. Several sets of apertures 274a, 274b may be provided so that the range of pivoting motion/position of drive arm 210 relative to drive paddle 211 may be selected. A plurality of opposed pairs of apertures 274a, 274b can be provided to accommodate alternate configurations of different types/brands/models of propulsion units 10 to which a header 203 having knife drive assembly 204 can be attached. A set of apertures can also be provided to accommodate transportation of the header 203 to which the knife drive assembly 204 is attached, when the header 203 is detached from the propulsion unit 10 and is being transported.

The left and right eccentrics 207, 206 and the driven pulley 218 form part of rotary bearing block assembly 212, as will be described further hereinafter. Drive paddle 211 has first and second ends, which extend from the center/medial region of drive assembly 204, to a second end region of the knife drive assembly 204, respectively. In some embodiments, drive paddle 211 may be substantially or at least in part, a vertically rigid I-beam shaped structure. The second outer end of drive paddle 211 can be attached with releasable attachment devices to the cutter bar 280 of cutter bar assembly 405.

The rotational power interface 302 receives an input rotational force from the output shaft 250 from the propulsion unit 10 (FIG. 1) and creates a rotational force at the left and right eccentrics 207, 206. In the rotational power interface 302, the drive belt 217 is attached to, and engagingly extends between, the drive pulley 205 and the driven pulley 218. The driven pulley 218 is operably interconnected to the left and right eccentrics 207, 206 on a common rotational axis, as will be explained hereafter. Drive belt 217 thus couples drive pulley 205 to driven pulley 218 and to left and right eccentrics 207, 206. In operation, the rotational power interface 302 of knife drive assembly 204 receives rotational power through the output shaft 250, thereby rotating the drive pulley 205. Drive pulley 205 rotates drive belt 217, which in turn rotates driven pulley 218 together with eccentrics 207, 206.

The rotational-to-longitudinal force converter 300 converts the rotational forces at driven pulley 218, into longitudinal forces at the left and right push rods 209, 208. In the rotational-to-longitudinal force converter 300, left and right and right eccentrics 207, 206 are attached to left and right connecting rods 221, 220 respectively.

In particular, a first end of each of left and right connecting rods 221, 220 interface with and are inter-connected to respective off-center rotating eccentric wrist pins 338, 339 (FIG. 10A) of each of the eccentrics 206, 207. The rotation of eccentrics 207, 206 therefore causes the connecting rods 221, 220 to move up and down, and longitudinally fore and aft (ie inward and outward) along the length of drive paddle 211 to generate longitudinal alternating forces. Furthermore, a first end of left and right push rods 209, 208 is attached (e.g. by bolt and nut, or by other known attachment means) to a second end of the left and right connecting rods 221, 220. The rotation of the eccentrics 207, 206 therefore also causes push rods 209, 208 to move up and down the along the length of the drive paddle 211 and longitudinally to generate longitudinal alternating forces.

The longitudinal-to-transverse force/movement converter 304 converts the longitudinal forces and reciprocating movement of left and right push rods 209, 208 into alternating transverse forces at, and reciprocating movement of, the left and right knife bearing heads 225, 226, knife head bearings 256, 255 and left and right knife heads 258, 257, respectively. The left and right bell cranks 224, 223 translate the longitudinal alternating forces of the left and right push rods 209, 208, respectively, into alternating transverse forces. The transverse forces engage the left and right knife bearing heads 225, 226. Knife bearing heads 225, 226 deliver the transverse forces through knife head bearings 256, 255, to left and right knife heads 258, 257, respectively, thereby moving the left and right knife assembly sections 201, 202 in transverse reciprocating motion.

More details of various components of one embodiment of the knife drive assembly 204 are now provided with particular reference to FIGS. 8-18. Drive pulley 205 is circular and may have a grooved outer edge to secure the drive belt 217 in position. In one embodiment, the drive belt 217 is a v-belt or micro-grooved belt. By providing such a belt with some level of slippage, the belt 217 acts as a clutch mechanism and can reduce the risk of damage if another part of the drive assembly mechanism were to lock up/seize. Driven pulley 218 may configured similarly to the drive pulley 205, having a circular shape and a grooved outer edge to secure the drive belt 217 in position. Drive belt 217 extends between drive pulley 205 and driven pulley 218, thereby causing the driven pulley 218 to rotate about a transverse axis when the drive pulley 205 receives a rotational force and rotates about a substantially parallel transverse axis.

The ratio of the diameter of the drive pulley 205 to the diameter of the driven pulley 218 influences the speed of rotation of the driven pulley 218 and thereby influences the speed of transverse reciprocating motion of the knives of the knife assembly sections 201, 202; i.e. the cutting speed. Accordingly, adjusting the diameter ratio of the two pulleys will influence the cutting speed. Such an adjustment is most useful if the rotational power received at the input shaft 250 from the external rotational power source has a fixed speed. In some embodiments, the drive pulley 205 is user replaceable, thereby allowing users to alter the cutting speed easily. The size/external diameter of drive pulley 205 can be selected to provide a suitable rotational speed when connected to output shaft 250. For example, the diameter of drive pulley 205 may be selected to achieve a rotation speed of in the range of approximately 550 rpm and 620 rpm.

Figure 10:
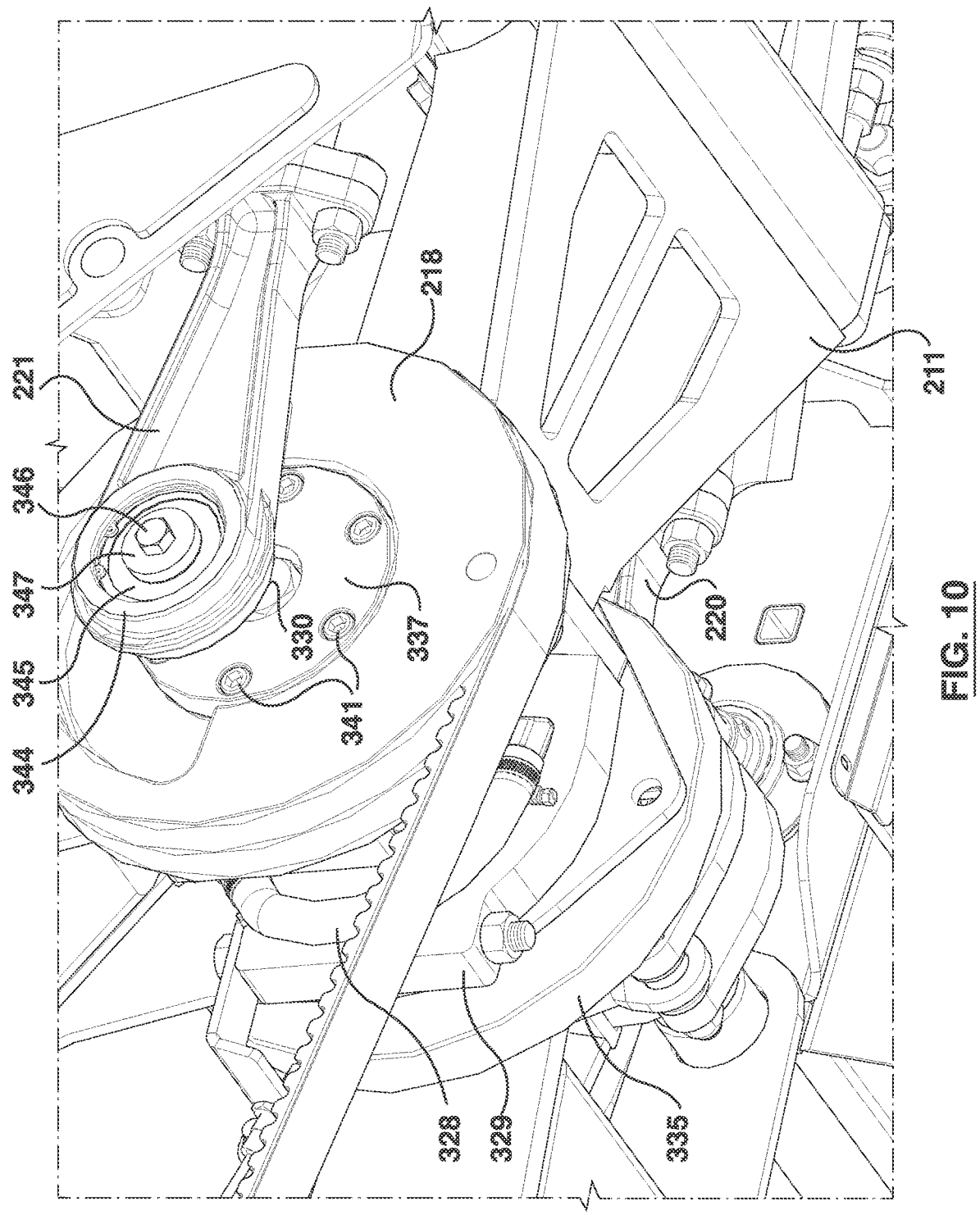
FIG. 10 is an enlarged perspective view of components of a rotary bearing assembly of the knife drive assembly of FIGS. 4 to 6.
Figure 10A:
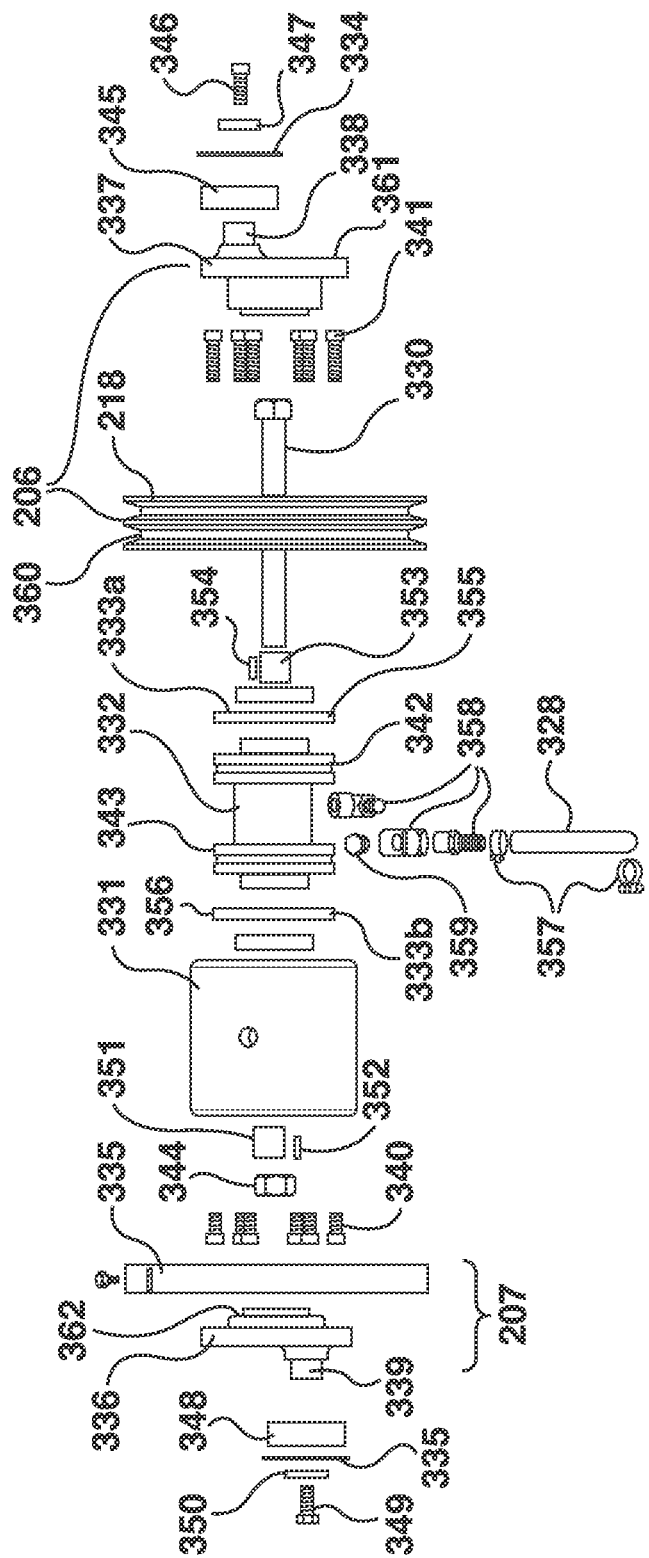
FIG. 10A is an enlarged exploded view of the rotary bearing assembly of the knife drive assembly of FIGS. 4 to 6.

Turning now to rotary bearing block assembly 212, this provides the mechanism to convert the rotation of the driven pulley 218 to provide longitudinal reciprocating movement of the push rods 208, 209. In overview, the rotary bearing block 212 comprises a crankshaft mechanism interconnected to and integrated with pitman arm/eye mechanism. With particular reference to FIGS. 10 and 10A, rotary bearing block assembly 212 includes the left eccentric 206 and the right eccentric 207, along with driven pulley 218. Left eccentric 206 is formed as a combined integrally connected flywheel 360/driven pulley 218. The left eccentric 206 also includes a first hub 337. Right eccentric 207 is formed as a flywheel 335 with a hub 336. Rotary block assembly also includes a rotary bearing journal 332 which functions a crankshaft and has rotary bearings 342, 343.

Hub eccentric 337 is mounted to flywheel 360/driven pulley 218 combination by insertion of the inner recessed portion 361 into an opening in flywheel 360/driven pulley 218 with bolts 341 secured through the outer periphery of hub eccentric 337 into threaded apertures in a flange (not shown) in fly wheel 360/driven pulley 218. Similarly hub eccentric 336 is mounted to fly wheel 335 by insertion of the inner recessed portion 362 of hub eccentric 336 into an opening in flywheel 335 and with bolts 342 secured through the outer periphery of hub eccentric 336 into threaded apertures in a flange (not shown) in flywheel 335.

The combination of hub eccentric 337 and flywheel 360/driven pulley 218 are mounted on a raised saw tooth outer circumferential portion 342 of the rotary bearing device 332. The saw tooth portion 342 of bearing device 332 will mate with an interior saw tooth profile in an inner surface of hub 337 connected to flywheel 360/driven pulley 218. A pin 354 is provided to engage the saw tooth connection to provide the proper positioning of hub 337 with bearing device 332. Similarly the combination of hub eccentric 336 and flywheel 335 are mounted on a raised saw tooth outer circumferential portion 343 of the rotary bearing device 332. The saw tooth portion 343 of bearing device 332 will mate with an interior saw tooth profile in an inner surface of hub 336 connected to flywheel 335. A pin 352 is provided to engage the saw tooth connection to provide the proper positioning of hub 336 with bearing device 332. By employing pin 354 with the saw tooth connection of hub 337 and pin 352 with the sawtooth connection of hub 336, it can be ensured that hub 336 is positioned in a 180 degrees out of phase relationship to hub 337.

A main axle bolt 330 passes through hub 337 and flywheel 360/driven pulley 218 combination and through hub 336 and flywheel 335, within rotary bearing 332. Axle bolt 330 joins with axle nut 344 to axially hold the entire combination of components together with and when the rotary bearing 332 mounted within bearing housing 331. Seals 333a, 333b and seal washers 355, 356 are provided for roller bearings 342, 343. Bushings 353, 351 may also be provided to assist with suitable alignment between hubs 337, 336 and the rotary bearing journal 332.

The combination of hub 337 and flywheel 360/driven pulley 218, and hub 336 and flywheel 335, along with rotary bearing 332 are thus fixedly connected together and rotate as one unit within bearing housing 331. This combination functions as a crankshaft to drive the movement of the push rods 208, 209.

Hub eccentrics 336, 337 and their corresponding flywheels 335 and 360 (along with driven pulley 218) will be rotated together with rotary bearing 332 about the longitudinal axis of the axle bolt 330, supported for rotation with axle bolt 330 and rotary bearing 332, within housing 331, when drive belt 217 is caused to move by drive pulley 205.

A pitman arm/eye mechanism is provided for each hub 336, 337. With reference to both FIGS. 10 and 10A, for hub 337, a bearing 345 for the pitman eye is provided and which is mounted on wrist pin 338. The outer race of bearing 345 is held in place by a snap ring 334. The inner race of bearing 345 is held in place by a bolt 346 which passes through a washer 347 and is received in a threaded aperture in wrist pin 338. The connecting rod 221 (which functions as a pitman arm) has an end with a circular aperture that is mounted on bearing 345. The outer race of bearing 345 is fixedly connected to the connecting rod 221. The inner race of bearing 345 is fixedly connected to the wrist pin 338. Thus, when wrist pin 338 rotates, the outer race of the bearing 345 with the end of connecting rod 221 fixedly connected thereto, will rotate relative to the inner race of bearing 345 and wrist pin 338.

The movement of hub eccentric 337 will cause an off-axis wrist pin 338 to rotate around in a planetary motion about the axis of the main axle bolt 330. It will be appreciated that as pin 338 rotates around the axis of main axle bolt 330, connecting rod 220 will undergo reciprocating longitudinal motion that by virtue of the connection with push rod 208 imparts reciprocating longitudinal motion on push rod 208.

For hub 336, a bearing 348 for the pitman eye is provided and which is mounted on wrist pin 339. The outer race of bearing 348 is held in place by a snap ring 335. The inner race of bearing 348 is held in place by a bolt 349, which passes through a washer 350 and is received in a threaded aperture in wrist pin 339. The connecting rod 220 (which also functions as a pitman arm) has an end with a circular aperture that is mounted on bearing 348. The outer race of bearing 348 will be fixedly connected to an end of the connecting rod 220. The inner race is fixedly connected to the wrist pin 338. Thus when wrist pin rotates, the outer race of the bearing 345 with connecting rod 221 fixedly connected thereto, will rotate relative to the inner race of bearing 345 and wrist pin 338.

Similarly, the movement of hub eccentric 336 will cause and off-axis pin 339 to rotate around in a planetary motion about the axis of the main axle bolt 330. It will then be appreciated that as pin 339 rotates around the axis of main axle bolt 330, connecting rod 221 209 will undergo reciprocating longitudinal motion that by virtue of the connection with push rod 209 imparts reciprocating longitudinal motion on push rod 200.

With reference to FIG. 10, rotary bearings 342, 343 may include oil for lubrication and an oil sight glass tube/level gauge 328 so that a user can readily monitor if the bearings contain sufficient lubricant oil. Additionally, right and left hand clamps 329 that surround housing 331 and rotary bearing 332 may be provided to hold the entire assembly firmly to the drive paddle 211 and its assembly.

Furthermore, it is also noted that the rotation of wrist pin 339 about the axis of axle bolt 330 is off-set by 180 degrees relative to rotation of wrist pin 338. The result is that the longitudinal movement of push rod 208 is 180 degrees out of phase with the longitudinal movement of push rod 209.

In other words, when the left connecting rod 221 and it's push rod 209 are fully extended outwards (i.e. towards the knife head 22), the right connecting rod 220 and its push rod 208 will be fully retracted (i.e. towards the drive pulley 205). And when the connecting rod 220 and its push rod 208 are fully extended outwards (i.e. towards the knife head 22), connecting rod 221 and its push rod 209 will be fully retracted (i.e. towards the drive pulley 205). The out-of-phase relationship of the left and right connecting rods 221, 220 and their corresponding push rods 208, 209 helps to reduce longitudinal vibrations as the vibrations of each of the rods and the knife assembly sections that they are connected to, are in opposite directions and mostly cancel one another out. This is because the 180 degrees out-of-phase relationship of the left and right rods 209, 208 also ensures that the left and right knife assembly sections 201, 202 move in reciprocating, opposite transverse directions relative to one another. Similarly, the out-of-phase relationship of the rods 221, 220 to reduce transverse vibrations as the vibrations of each of the left and right knife sections 201, 202 are in opposite directions and mostly cancel one another out.

In one embodiment, push rods 209, 208 may each be made of a hollow tube formed form a suitable material such as steel. The hollow tubes allow the push rods 209, 208 to flex if needed due to the longitudinal forces applied thereon. Connecting rods (pitman arms) 221, 220, on the other hand, may be made of more rigid construction and material such as cast or forged steel and do not flex to a significant extent. The more stable connecting rods 221, 220 therefore protect the eccentrics 207, 206 from the longitudinal forces applied thereon, thereby enhancing stability and long-term endurance of the rotary bearing block assembly 212.

Turning now to FIGS. 15 to 18, bell cranks 223, 224, ball joints 228, 227, knife bearing heads 226, 225, knife bearings 255, 256 knife heads 257, 258 and other components associated with the longitudinal-to-transverse force and movement converter 304 are illustrated in detail. The longitudinal-to-transverse converter 304 moves left and right knife assembly sections 201, 202 in reciprocating transverse motion against and through slots 261 in fixed guards 260. Fixed guards 260 have cutting edges, and in some embodiments are made of spring steel, forged steel, or other material having a relatively high yield strength. The movement of the left and right knife sections 201, 202 against the fixed guards 260 and through slots 261 is sufficient to cut crops in between the fixed guards 260 and knife assembly sections 201, 202.

The knife end 222 of the drive paddle 211 is at the outward end portion of the drive paddle. Cutter bar mounting plate portion 279 of knife end 222 of paddle 211 may be integrally formed at the outward end of drive paddle 211, be positioned near the outward side 293 of the header 203 and be mounted directly to a cutter bar 280 by nuts/bolts 297 or other releasable attachment mechanisms.

Knife end 222 of the paddle 211 may have generally 'L' shaped right and left bell cranks 223, 224. Bell cranks 223, 224 may be mounted for rotation about respective axes Y1 and Y2 (see FIG. 17) with suitable cartridge bearings 253, 252, which may be a cam roller type bearing with a high strength outer race. An example of a suitable bearing is the model nos. RLR CAM-RBY3-OH-PC1 available from Ringball Corporation. At a first end of the 'L', the right and left bell cranks 223, 224 receive longitudinal forces and from the left and right push rods 208, 209 respectively (as shown by arrows in FIG. 16) with concordant longitudinal reciprocating movement. At a second end of the 'L', the left and right bell cranks 223, 224 output alternating transverse forces (as shown by arrows in FIG. 16), to the left and right knife bearing heads 225, 226, respectively The outward ends of the right and left push rods 208, 209 are attached to left and right ball joints 228, 227, respectively. Rod end units such as model BRTM made by DURBAL can be utilized to connect the push rods 208, 209 to the ball joints 228, 229. Ball joints 228, 229 provide the interface between the bell cranks 223, 224 and the push rods 208, 209. Each ball joint 228, 229 performs at least two specific functions: (1) to provide a small degree of freedom as the angle of motion between the push rods 208, 209 and bell cranks 223, 224 are not identical; and (2) to provide a means of adjusting the timing of the mechanism accurately. The right and left ball joints 228, 227 have threaded shafts to receive threaded second ends of the left and right push rods 208, 209 respectively. The threaded second ends can be locked into place with a nut to secure the push rods 209, 208 at the appropriate length. The left and right ball joints 228, 227 also interface with the left and right bell cranks 223, 224 and provide a degree of freedom (e.g. 3-5 degrees) to the push rods 208, 209, as the orientation of the push rods 208, 208 and the bell cranks 223, 224 may not be identical.

Right and left bell cranks 223, 224 are secured to mounting plate portion 279 of knife end 222 of paddle 211 by left and right bottom end caps (not shown), respectively. This connection secures the combination of components that form longitudinal-to-transverse force and movement converter 304 to the cutter bar mounting plate portion 279 and thus to the cutter bar assembly 405.

A top end cap 277 (see FIG. 15; omitted in FIGS. 16 and 17) is also provided and secures the left and right bell cranks 223, 224 and the corresponding cartridge bearings 253, 252 in substantially fixed and/or stable position relative to each other (at least in a transverse direction). Each end of top end cap 277 is secured to an inner race of one of the cartridge bearings 252, 253 on a mating face. Nuts 285, 286 for bell cranks 223, 224 respectively are used to tie together the assembly of the cutter bar mounting plate portion 279, the cartridge bearings 253, 252 and top end cap 277, on the bearing inner race. The outer race of cartridge bearings 253 252 supports bell cranks 223, 224 which are captured and held between the top end cap 277 above, and the cutter bar mounting plate portion 279 below, during rotation. The use of top end cap 277 also enhances the overall stability during operation of the knife drive assembly 204, of the entire longitudinal-to-transverse force and movement converter mechanism 304 that includes the end of rods 208, 209, the ball joints 228, 227, bell cranks 223, 224 and knife bearing heads 225, 226, preventing or at least significantly reducing wear due to the deflection during operation.

Right and left bell cranks 223, 224 are also attached to right and left knife bearing heads 226, 225, respectively, with in each case the use of two bolts. In one embodiment, knife bearing heads 225, 226 may be made of needle roller bearings, which use small cylindrical rollers (not shown). For example, knife head bearings may be model RIR-RNA6905 bearings supplied by Ringball Corporation. The cylindrical rollers of the left and right knife bearing heads 225, 226 engage left and right knife head bearings 255, 256 (FIGS. 16 and 17), respectively. The left and right knife head bearings 255, 256 are a part of the knife heads 257, 258, which are bolted to the right and left knife sections 202, 201, respectively.

Both of the knife assembly sections 201, 202 include triangular knife sections 262 bolted to a common knife back plate. Fixed knife guards 260 are bolted in a fixed manner to cutter bar 280. Knife assembly sections 201, 202 are separated into two separate sections, each corresponding with the left and right. Knife assembly sections 201, 202 move in reciprocating transverse directions due to the force applied by the right and left knife bearing heads 225, 226 to the right and left knife head bearings 255, 256. The guards 260 each include a slot 261 (FIG. 18) to allow the triangular knifes 262 to move in the transverse direction through the guards.

Figure 17:
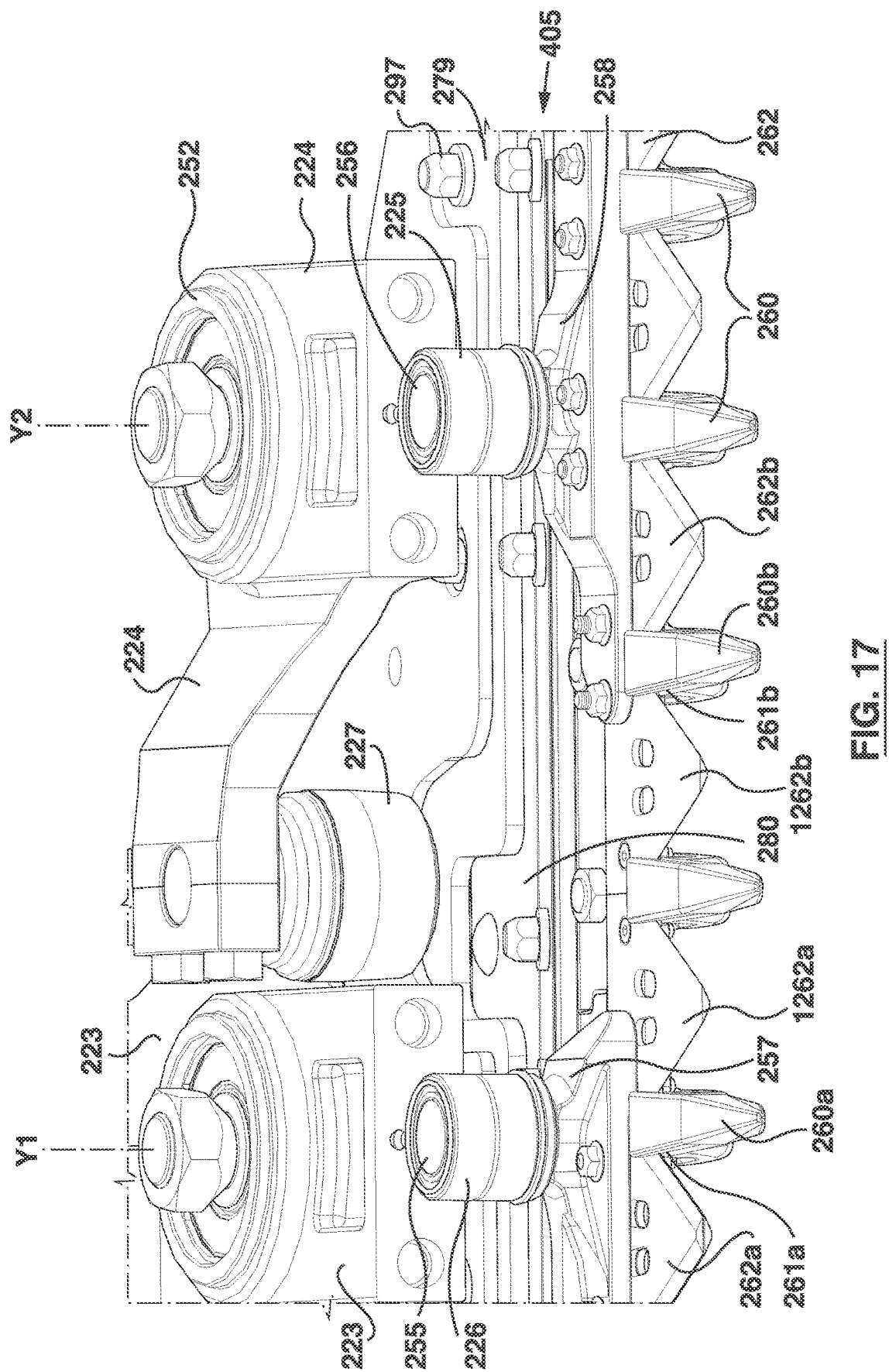
FIG. 17 is further enlarged top front perspective view of some of the components shown in FIG. 16.
Figure 18:
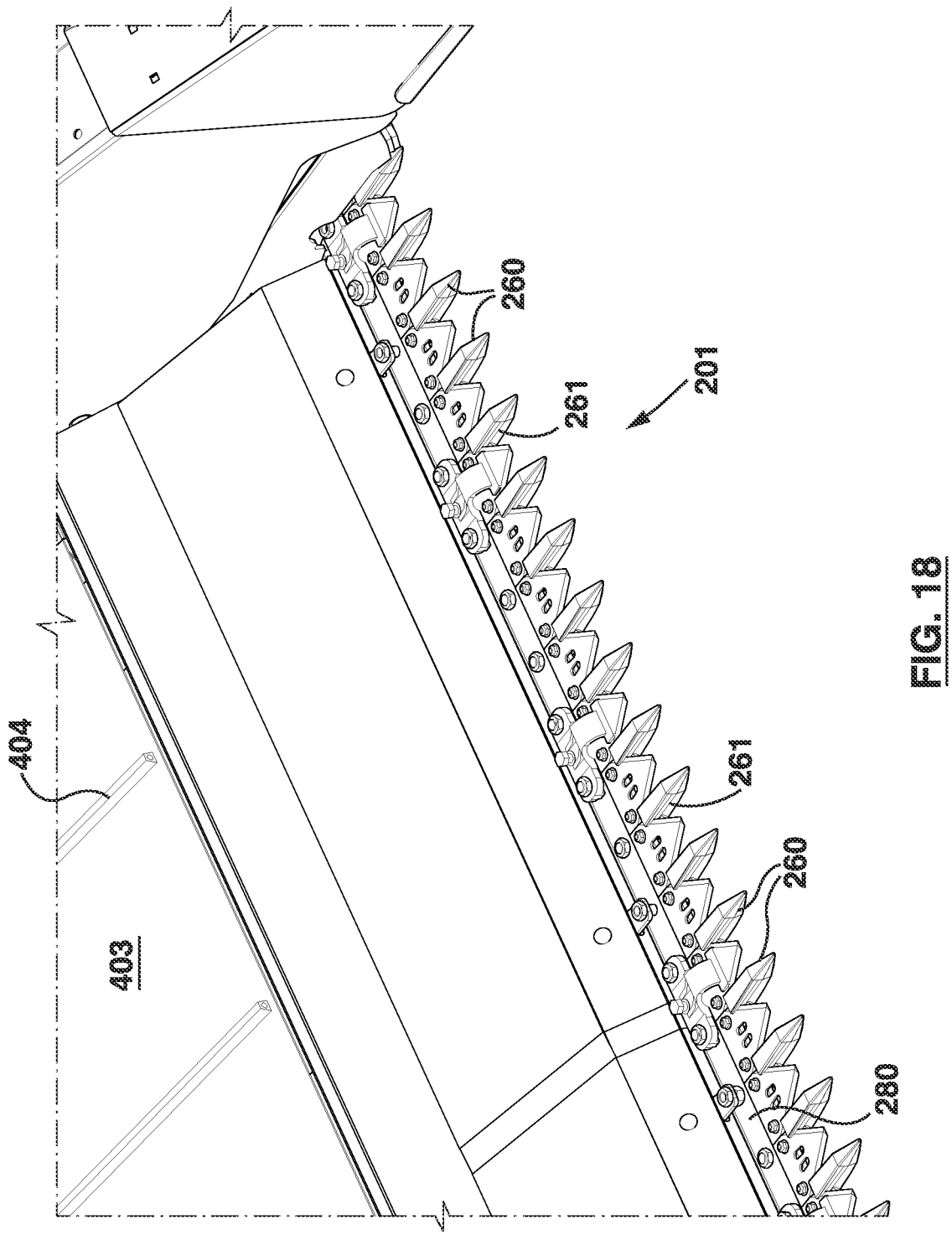
FIG. 18 is a front perspective view of a end of a header employing the knife drive assembly of FIGS. 3 to 6.

With particular reference to FIG. 17, the furthest blade to the right in knife section 202 is blade 262a. Immediately adjacent to it on the right in FIG. 17 is a fixed blade 1262a. When knife section 202 moves to the left (ie. the right as seen in FIG. 17), blade 262a will slide through the slot 261a in guard 260a and will move over top of fixed blade 1262a. Similarly, it will be noted that the furthest blade to the left in knife section 201 is blade 262b. Immediately adjacent to it on the left is a fixed blade 1262b. When knife section 201 moves to the right (ie. the left as seen in FIG. 17), blade 262b will slide through the slot 261b in guard 260b and will move over top of fixed blade 1262b.

It should be noted that when the left and right push rods 209, 208 are in an out-of-phase relationship relative to one another, the left and right knife assembly sections 201, 202 will also be in out-of-phase relationship relative to one another. In other words, when the left push rod 209 is fully extended (i.e. towards the knife head 222), the right push rod 208 will be fully retracted (i.e. towards the drive pulley 205), the left knife section 201 will be at the extreme right position, and the right knife section 202 will be at the extreme left position. Each of the knife assembly sections 201, 202 will therefore move in an opposite direction relative to the another. Moving the knife sections 201, 202 in opposite directions relative to one another reduces transverse vibrations, as the vibrations will mostly cancel out.

Knife assembly sections 201, 202 may also be of equal of unequal lengths. With reference to FIG. 3, the knife assembly sections 201, 202 are of equal (or near equal) lengths when knife drive assembly 204 extends at the center line of the harvesting header 203. However, when the knife drive assembly 204 extends at one side of the harvesting header 203 (i.e. either fully to the right or left of the center line), then one of the knife assembly sections 202, 201 is typically going to be of greater length. Accordingly, to maintain the out-of-phase relationship between the knife assembly sections 201, 202, the shorter knife section is over-stroked, perhaps by about ½ inch, more than the longer section. This over-stroking of the shorter section can be accomplished by adjusting the position of one crank pin/wrist pin 338 so that the distance from the center of its hub 337 is greater than the distance of the crank pin/wrist pin 339 of its hub 336. Thus one pitman eye will have a slightly larger rotational diameter than the other pitman eye. This translates into a greater longitudinal reciprocating movement of rod 209 compared to rod 208. This translates into a greater transverse movement of knife assembly section 201 compared to knife assembly section 202

In operation, rotational power may be provided from the output shaft 250 of a propulsion unit 10 for a piece of agricultural machinery such as a combine harvester. Rotation of output shaft 250 will rotate drive shaft 205 in rotation about its axis and this will cause drive pulley 205 to rotate about the same axis. Rotation of drive pulley 205 will cause drive belt 217 to move. Movement of drive belt 217 will cause driven pulley 218 to rotate. Rotation of driven pulley 218 about its axis causes the entire crankshaft mechanism including hub 337 and flywheel 360, hub 336 and flywheel 335, along with rotary bearing 332 to rotate as one unit within bearing housing 331. The rotation of hubs 336, 337 causes the pitman eye connections at wrist pins 338, 339 to move in orbit around the central axis. The movement of wrist pins 338, 339, causes connecting rods (pitman arms) 221, 220 and their interconnected push rods 209, 208 to move in reciprocating longitudinal movement. This longitudinal movement of push rods 209, 208 in turn causes bell cranks 224, 223 respectively to rotate about their axes causing knife heads 258, 257 to move transversely in reciprocating movement along with their knife assembly sections 201, 202 including knife blades 262. Knife assembly sections are preferably configured to move out of phase with each other, preferably 180 degrees out of phase. With such reciprocating transverse motion, knife assembly sections 201 202 are operable to be able to cut crop material that comes into contact therewith.

It will be appreciated by those skilled in the art that changes could be made to the various aspects of the subject application described above without departing from the inventive concept thereof. It is to be understood, therefore, that this subject application is not limited to the particular aspects disclosed, but it is intended to cover modifications as defined by the appended claims.

When introducing elements of the present invention or the embodiments thereof, the articles "a," "an," "the," and "said" are intended to mean that there are one or more of the elements. The terms "comprising," "including," and "having" are intended to be inclusive and mean that there may be additional elements other than the listed element.

The invention claimed is:

1. A knife drive assembly for a harvesting header operable to move a first knife and a second knife in reciprocating transverse motion, the assembly comprising:
   (a) an interface mechanism operable to couple with a power source to cause rotational movement of a rotating member;
   (b) a first movement conversion mechanism operable to convert the rotational movement of said rotating member to reciprocating generally longitudinal movement of a first generally longitudinally extending movement member and said first movement conversion mechanism operable to convert the rotational movement of said rotating member to reciprocating generally longitudinal movement of a second generally longitudinally extending movement member;
   (c) a second movement conversion mechanism operable to convert the reciprocating generally longitudinal movement of the first generally longitudinally extending movement member to transverse reciprocating movement of the first knife; and wherein said second movement conversion mechanism operable to convert the reciprocating generally longitudinal movement of the second generally longitudinally extending movement member to transverse reciprocating movement of the second knife.

2. An assembly as claimed in claim 1 wherein said rotating member is a first rotating member, and further comprising a second rotating member operably connected to said first rotating member such that rotation of said first rotating member causes rotation of said second rotating member.

3. An assembly as claimed in claim 1 wherein the generally longitudinal reciprocating movement of the first generally longitudinally extending movement member is substantially 180 degrees out of phase with the generally longitudinal movement of said second generally longitudinally extending movement member and the transverse movement of the first knife is substantially 180 degrees out of phase with the transverse movement of the second knife.

4. An assembly as claimed in claim 1, wherein said second movement conversion mechanism comprises:
   a bell crank device operable to convert the reciprocating generally longitudinal movement of the first generally longitudinally extending movement member to reciprocating transverse movement;
   a bearing device operably interconnected to said bell crank device;
   wherein said bell crank device is interconnected to an end portion of said first generally longitudinally extending movement member and to said bearing device;
   wherein said bearing device is operably connected to said first knife; and
   wherein during operation generally longitudinal movement of said first generally longitudinally extending movement member imparts a rotation of said bell crank device and wherein said rotation of said bell crank device imparts transverse movement of said bearing device and transverse movement of said first knife connected thereto.

5. An assembly as claimed in claim 4 wherein said bearing device comprises a knife head bearing device connected to a knife head, said knife head being connected to said first knife.

6. An assembly as claimed in claim 5 wherein said second movement conversion mechanism further comprises a ball joint device interposed between said bell crank device and said end portion of said at least one longitudinally extending movement member.

7. An assembly as claimed in claim 1 wherein said second movement conversion mechanism is operable to convert the reciprocating generally longitudinal movement of the first and second longitudinally extending movement members to drive first and second knives respectively in transverse motion, wherein the transverse movement of said first knife is out of phase with the transverse movement of said second knife.

8. An assembly as claimed in claim 7 wherein the transverse movement of said first knife is substantially 180 degrees out of phase with the transverse movement of said second knife.

9. An assembly as claimed in claim 1, wherein said second movement conversion mechanism comprises:
a first bell crank device operable to convert the reciprocating generally longitudinal movement of the first longitudinally extending movement member to reciprocating transverse movement;
a first bearing device operably interconnected to said first bell crank device;
wherein said first bell crank device is interconnected to an end portion of said first generally longitudinally extending movement member and to said first bearing device;
wherein said first bearing device is operably connected to said first knife;
and wherein said second movement conversion mechanism comprises:
a second bell crank device operable to convert the reciprocating generally longitudinal movement of the second longitudinally extending movement member to reciprocating transverse movement;
a second bearing device operably interconnected to said first bell crank device;
wherein said second bell crank device is interconnected to an end portion of said second generally longitudinally extending movement member and to said first bearing device;
wherein said second bearing device is operably connected to said second knife;
wherein during operation generally longitudinal movement of the first generally longitudinally extending movement member imparts a rotation of said first bell crank device and wherein said rotation of said first bell crank device imparts transverse movement of said first bearing device and said first knife connected thereto; and
wherein during operation generally longitudinal movement of the second generally longitudinally extending movement member imparts a rotation of said second bell crank device and wherein said rotation of said second bell crank device imparts transverse movement of said second bearing device and said second knife connected thereto.

10. An assembly as claimed in claim 9 wherein said first bearing device comprises a first knife head bearing device connected to a first knife head, said first knife head being connected to said first knife, and wherein said second bearing device comprises a second knife head bearing device connected to a second knife head, said second knife head being connected to said second knife.

11. An assembly as claimed in claim 10, wherein said second movement conversion mechanism further comprises: a first ball joint device interposed between said first bell crank device and said end portion of said first generally longitudinally extending movement member; and a second ball joint device interposed between said second bell crank device and said end portion of said second generally longitudinally extending movement member.

12. An assembly as claimed in claim 1 wherein said first movement conversion mechanism and said second movement conversion mechanism are supported on a generally longitudinally oriented support frame.

13. An assembly as claimed in claim 12 wherein said support frame comprises a first portion supporting at least part of said rotation interface mechanism.

14. An assembly as claimed in claim 13 wherein said first portion of said support frame is pivotally adjustable relative to second portion of said support frame.

15. An assembly as claimed in claim 14 wherein said second movement conversion mechanism is supported on said second portion of said support frame.

16. A header for an agricultural apparatus, said header operable to cut crop material, said header comprising:
a header frame;
a cutter bar assembly having at least one transversely oriented knife; and
a knife drive assembly comprising a support frame, said knife drive assembly mounted longitudinally between an inward region of said header frame and said cutter bar assembly, wherein said knife drive assembly comprises the knife drive assembly of claim 1.

17. A header as claimed in claim 16 wherein said knife drive assembly is releasably mounted longitudinally at only a first location located at an inward region of said header frame and a second location proximate said cutter bar assembly.

18. A header as claimed in claim 16, wherein said knife blade assembly is configured for installation and removal as a unit.

19. An agricultural apparatus comprising:
(a) a propulsion unit comprising having a rotating output shaft operable to cause rotation of a rotating member; and
(b) a header for an agricultural apparatus, said header comprising:
a header frame;
a cutter bar assembly having first and second transversely oriented knives; and
a knife drive assembly mounted longitudinally between an inward region of said header frame and said cutter blade assembly, said knife drive assembly comprising a knife drive assembly as claimed in claim 1.

20. An assembly as claimed in claim 1 wherein each of said interface mechanism, said first movement conversion mechanism and said second movement conversion mechanism are mounted to a support frame.

21. An assembly as claimed in claim 20 wherein said interface mechanism is longitudinally located at a first end region of the assembly, the first movement conversion mechanism is longitudinally disposed at a medial region of the assembly and said second movement conversion mechanism is longitudinally disposed at a second end region of the assembly, longitudinally opposite to said first end region.

22. A header for an agricultural apparatus, said header comprising:
a header frame;
a cutter bar assembly having at least one transversely oriented knife; and
a knife drive assembly mounted longitudinally between an inward region of said header frame and said cutter blade assembly, said knife drive assembly comprising a knife drive assembly as claimed in claim 1;
wherein the knife drive assembly is mounted proximate a transverse center line of the header.

23. A header as claimed in claim 22 further comprising a draper deck assembly supported on said header frame, and wherein said knife drive assembly is positioned beneath the draper deck assembly.

24. A header comprising:
a header frame;
a cutter bar assembly mounted to said frame, said cutter bar assembly having at least one knife;
a knife drive assembly mounted to said header frame and extending generally longitudinally between an inward region of said header frame and said cutter bar assembly;
wherein said knife drive assembly is configured and operable to move said at least one knife in transverse motion, the knife drive assembly comprising:
(a) a first movement conversion mechanism operable to convert rotation of a rotational input power source to reciprocating generally longitudinal movement of at least one generally longitudinally extending movement member;
(b) a second movement conversion mechanism operable to convert the reciprocating longitudinal movement of the at least one generally longitudinally extending movement member to transverse reciprocating movement of at least one knife;
wherein said at least one generally longitudinally extending movement member is a first generally longitudinally extending movement member and wherein said assembly further comprises a second generally longitudinally extending movement member; and wherein said at least one knife comprises a first knife and a second knife;
and wherein said first movement conversion mechanism is operable to convert the rotation of said rotational input power source to reciprocating generally longitudinal movement of the first and second generally longitudinally extending movement members;
and wherein the second movement conversion mechanism operable to convert the reciprocating generally longitudinal movement of the first generally longitudinally extending movement member to transverse reciprocating movement of the first knife and operable to convert the reciprocating generally longitudinal movement of the second generally longitudinally extending movement member to transverse reciprocating movement of the second knife.

25. A header as claimed in claim 24 further comprising a draper deck assembly comprises a draper table operable for moving a cut crop, said draper deck assembly supported on said header frame, and wherein said knife drive assembly is positioned beneath the draper table.

26. An assembly as claimed in claim 9, wherein said first movement conversion mechanism further comprises:
a first eccentric interconnected to said movement member, said first eccentric comprising a first eccentric member positioned at a radial distance away from an axis of rotation, and said first eccentric member is operable to rotate about said axis of rotation;
and wherein said first generally longitudinally extending movement member is interconnected to said first eccentric member such that in operation during rotation of said first eccentric member, said first eccentric member travels in a path around said axis of rotation, resulting in reciprocating longitudinal movement being imparted to said first longitudinally extending movement member;
wherein said first movement conversion mechanism further comprises a second eccentric interconnected to said movement member, said second eccentric comprising a second eccentric member positioned at a radial distance away from said axis of rotation, and said second eccentric member is operable to rotate about said axis of rotation;
and wherein said second generally longitudinally extending movement member is interconnected to said second eccentric member such that in operation during rotation of said second eccentric, said second eccentric member travels in a path around said axis of rotation, resulting in reciprocating longitudinal movement being imparted to said second generally longitudinally extending movement member.

27. An assembly as claimed in claim 26, wherein the movement of said first eccentric member of said first eccentric and said first generally longitudinally extending movement member is out of phase with the movement of said second eccentric member of said second eccentric and said second generally longitudinally extending movement member.

28. An assembly as claimed in claim 26, wherein said first eccentric member of said first eccentric is interconnected to said first generally longitudinally extending movement member with a first connecting rod, and wherein said second eccentric member of said second eccentric is interconnected to said second generally longitudinally extending movement member with a second connecting rod.

29. An assembly as claimed in claim 28, wherein said first eccentric and said first connecting rod comprise a first pitman eye type mechanism and wherein said second eccentric and said second connecting rod comprise a second pitman eye type mechanism.

30. A knife drive assembly for a harvesting header operable to move a first knife and a second knife in reciprocating transverse motion, the assembly comprising:
(a) an interface mechanism operable to couple with a power source to cause movement of a member;
(b) a first movement conversion mechanism operable to convert the movement of said member to reciprocating generally longitudinal movement of a first generally longitudinally extending movement member and said first movement conversion mechanism operable to convert the movement of said member to reciprocating generally longitudinal movement of a second generally longitudinally extending movement member;
(c) a second movement conversion mechanism operable to convert the reciprocating generally longitudinal movement of the first generally longitudinally extending movement member to transverse reciprocating movement of the first knife; and wherein said second movement conversion mechanism operable to convert the reciprocating generally longitudinal movement of the second generally longitudinally extending movement member to transverse reciprocating movement of the second knife.

31. An assembly as claimed in claim 30 wherein the generally longitudinal reciprocating movement of the first generally longitudinally extending movement member is substantially 180 degrees out of phase with the generally longitudinal movement of said second generally longitudinally extending movement member and the transverse movement of the first knife is substantially 180 degrees out of phase with the transverse movement of the second knife.

32. An assembly as claimed in claim 30, wherein said first movement conversion mechanism further comprises:
a first eccentric interconnected to said movement member, said first eccentric comprising a first eccentric member positioned at a radial distance away from an axis of rotation, and said first eccentric member is operable to rotate about said axis of rotation;

and wherein said first generally longitudinally extending movement member is interconnected to said first eccentric member such that in operation during rotation of said first eccentric member, said first eccentric member travels in a path around said axis of rotation, resulting in reciprocating longitudinal movement being imparted to said first longitudinally extending movement member;

wherein said first movement conversion mechanism further comprises a second eccentric interconnected to said movement member, said second eccentric comprising a second eccentric member positioned at a radial distance away from said axis of rotation, and said second eccentric member is operable to rotate about said axis of rotation;

and wherein said second generally longitudinally extending movement member is interconnected to said second eccentric member such that in operation during rotation of said second eccentric, said second eccentric member travels in a path around said axis of rotation, resulting in reciprocating longitudinal movement being imparted to said second generally longitudinally extending movement member.

33. An assembly as claimed in claim 32, wherein said first eccentric member of said first eccentric is interconnected to said first generally longitudinally extending movement member with a first connecting rod, and wherein said second eccentric member of said second eccentric is interconnected to said second generally longitudinally extending movement member with a second connecting rod.

34. An assembly as claimed in claim 33, wherein said first eccentric and said first connecting rod comprise a first pitman eye type mechanism and wherein said second eccentric and said second connecting rod comprise a second pitman eye type mechanism.

35. An assembly as claimed in claim 34, wherein the movement of said eccentric member of said first eccentric and said first generally longitudinally extending movement member is out of phase with the movement of said second eccentric member of said second eccentric and said second generally longitudinally extending movement member.

36. An assembly as claimed in claim 35, wherein said first eccentric member of said first eccentric is interconnected to said first generally longitudinally extending movement member with a first connecting rod, and wherein said second eccentric member of said second eccentric is interconnected to said second generally longitudinally extending movement member with a second connecting rod.

37. An assembly as claimed in claim 36, wherein said first eccentric and said first connecting rod comprise a first pitman eye type mechanism and wherein said second eccentric and said second connecting rod comprise a second pitman eye type mechanism.

38. A harvesting header comprising:
a header frame;
a cutter bar assembly having first and second transversely oriented knives; and
a knife drive assembly mounted longitudinally between an inward region of a header frame and said cutter blade assembly, said knife drive assembly comprising a knife drive assembly as claimed in claim 30.

39. A harvesting header as claimed in claim 38, further comprising a draper deck assembly supported on said header frame, and wherein said knife drive assembly is positioned beneath the draper deck assembly.

* * * * *